US008505088B2

(12) United States Patent
Khalil et al.

(10) Patent No.: US 8,505,088 B2
(45) Date of Patent: Aug. 6, 2013

(54) KEY EXCHANGE FOR A NETWORK ARCHITECTURE

(75) Inventors: Mohamed Khalil, Dallas, TX (US);
Raja P. Narayanan, Irving, TX (US);
Haseeb Akhtar, Garland, TX (US);
Emad A. Qaddoura, Plano, TX (US)

(73) Assignee: Microsoft Corporation, Redmond, WA (US)

( * ) Notice: Subject to any disclaimer, the term of this patent is extended or adjusted under 35 U.S.C. 154(b) by 298 days.

(21) Appl. No.: 12/546,282

(22) Filed: Aug. 24, 2009

(65) Prior Publication Data
US 2009/0313692 A1 Dec. 17, 2009

Related U.S. Application Data

(62) Division of application No. 10/089,752, filed as application No. PCT/US00/27352 on Oct. 4, 2000, now Pat. No. 7,590,843.

(60) Provisional application No. 60/157,818, filed on Oct. 5, 1999.

(51) Int. Cl.
*G06F 17/00* (2006.01)

(52) U.S. Cl.
USPC .............................................. 726/15

(58) Field of Classification Search
USPC ................... 726/15; 713/171; 380/247, 248, 380/250, 270, 272, 273
See application file for complete search history.

(56) References Cited

U.S. PATENT DOCUMENTS

| 5,708,716 | A | 1/1998 | Tisdale |
| 6,167,513 | A | 12/2000 | Inoue |
| 6,400,722 | B1 | 6/2002 | Chuah |
| 6,418,130 | B1 | 7/2002 | Cheng |
| 6,453,159 | B1 | 9/2002 | Lewis |
| 6,501,767 | B1 | 12/2002 | Inoue |
| 6,760,444 | B1 * | 7/2004 | Leung ........................ 380/270 |
| 2002/0089958 | A1 * | 7/2002 | Feder et al. .................. 370/338 |

FOREIGN PATENT DOCUMENTS

EP 0 912 026 A 4/1999

OTHER PUBLICATIONS

Request for Comments: 2408, D. Maughan et al. Standards Track Nov. 1998, pp. 6-8 and 46.*
Jacobs S., et al: "Security of Current Mobile IP Solutions" Nov. 3-5, 1997, New York, NY:IEEE, US, Nov. 3, 1997, pp. 1122-1128, XP000792591 ISBN: 0-7803-4250-X.
Jordan F., et al: "Secure Multicast Communications Using a Key Distribution Center" Proceedings of the IFIP TC6 International Conference on Information Networks and Data Communication, Fuchal, Madeira Island, Portugal, Apr. 18-21, 1994, Amsterdam, North Holland, NL, vol. CONF. 5, Apr. 18, 1994, pp. 367-380, XP000593303 ISBN: 0-444-81869-3.
Richard E., Smith: "XP00216543 Security at the IP Layer" Oct. 1997, Addison-Wesley, USA/Canada 7 pp. 120-121 and p. 200-203.

(Continued)

*Primary Examiner* — Ellen Tran
(74) *Attorney, Agent, or Firm* — Wolfe-SBMC

(57) ABSTRACT

Provided is a method of providing secure communication between an initiator and a responder in a communication network. The method includes presenting a registration request with one or more proposals for dynamically establishing a security association between the initiator and the responder, and receiving a registration response indicating whether any of the one or more proposals have been accepted for the security association.

23 Claims, 26 Drawing Sheets

(56) References Cited

OTHER PUBLICATIONS

Harkins, et al: "The Internet Key Exchange (IKE)" Network Working Group RFC 2409, Internet Engineering Task Force (IETF) standards track, Nov. 1998, XP002165435 p. 12, paragraph 5.2—p. 19, last line.

Maughan, Schertler, Schneider, Turner: "Network Working Group RFC 2408 Standards Track" Internet Security Association and Key Management Protocol (ISAKMP), Nov. 1998, XP002165436 p. 27, paragraph 3.4 p. 31, last line p. 44, paragraph 4—p. 54, paragraph 4.6.

Frankel, et al., : "Security Issues in a CDPD Wireless Network" Aug. 1995, IEEE Personal Communications, No. 4, New York, N.Y., pp. 16-27.

Office Action mailed Mar. 17,2006 in U.S. Appl. No. 10/089,752, filed Sep. 12, 2002.

Office Action mailed Oct. 27, 2006 in U.S. Appl. No. 10/089,752, filed Sep. 12, 2002.

Office Action mailed Jul. 24, 2007 in U.S. Appl. No. 10/089,752, filed Sep. 12, 2002.

Office Action mailed Nov. 9, 2007 in U.S. Appl. No. 10/089,752, filed Sep. 12, 2002.

Office Action mailed Jun. 13, 2008 in U.S. Appl. No. 10/089,752, filed Sep. 12, 2002.

Office Action mailed Nov. 7, 2008 in U.S. Appl. No. 10/089,752, filed Sep. 12, 2002.

International Search Report, Application No. PCT/US00/27352, (May 17, 2001), 5 pages.

Notice of Allowance, U.S. Appl. No. 10/089,752, (May 7, 2009), 6 pages.

* cited by examiner

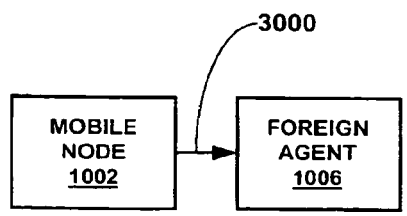
Fig. 14a
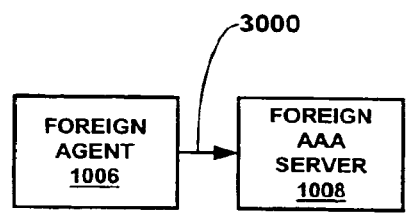
Fig. 14b
Fig. 14c
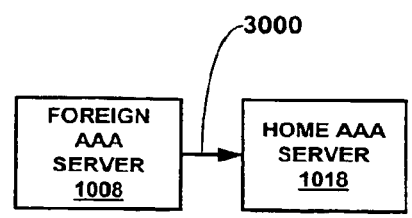
Fig. 14d
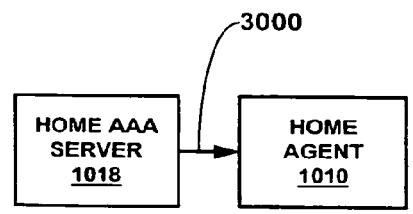

Fig. 15a
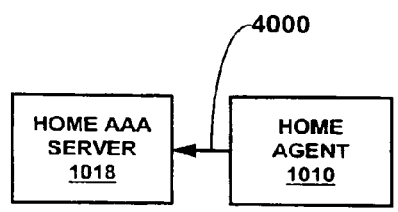
Fig. 15b
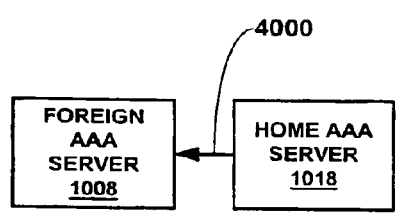
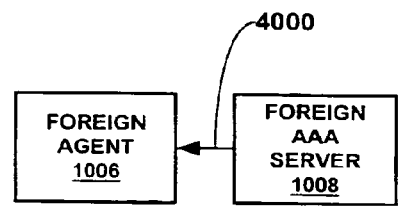
Fig. 15c
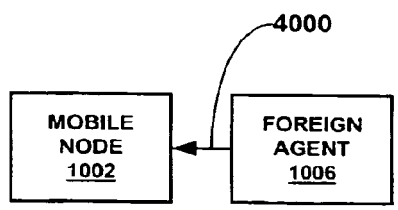
Fig. 15d

KEY EXCHANGE FOR A NETWORK ARCHITECTURE

CROSS-REFERENCE TO RELATED APPLICATION

The present application is a divisional of U.S. patent application Ser. No. 10/089,752, filed Sep. 12, 2002, which was the National Stage of International Application No. PCT/US00/27352, filed Oct. 4, 2000, which claims the benefit of U.S. Provisional Application No. 60/157,818, filed Oct. 5, 1999, the entire disclosures of which are hereby incorporated by reference in their entirety.

TECHNICAL FIELD

This invention relates generally to management techniques for a communications network and, more particularly, to a system and method for providing secure communications in a communications network.

BACKGROUND OF THE INVENTION

As deployment of global IP networks becomes more widespread, there are several challenges faced by users of such networks, such as providing secure access for users. Conventional protocols for providing user security are inadequate.

For example, as illustrated in FIG. 1, a typical communication system 10 may include a mobile node 12 positioned within a foreign domain 14 that is serviced by a foreign agent 16. The foreign agent 16 may be operably coupled to the mobile node 12 and a home agent 18 that services a home domain 20 by communication pathways, 22 and 24, respectively. Communication between the mobile node 12, foreign agent 16, and home agent 18 may be provided by a conventional IP communications protocol such as, for example, TCP/IP.

During operation, the mobile node 12 may roam over the foreign domain 14. In order to securely communicate messages between the mobile node 12 and the home agent 18, a secure communication pathway should be provided between the mobile node and the foreign agent and between the foreign agent and the home agent. One method of providing a secure communication pathway between the mobile node 12 and the home agent 18 is to encrypt communications between the mobile node and home agent using one or more shared secrets, or encryptions keys. However, conventional methods of providing such encryption keys suffer from a number of serious drawbacks.

For example, in order to provide a secure communication pathway between the mobile node 12 and the foreign agent 16, a predefined shared secret, or encryption key, could be used to provide secure communications over the communications pathway 24. However, in order to permit secure communications between the mobile node 12 and all possible foreign agents, a virtually infinite number of predefined shared secrets, or encryption keys, would be required for every potential mobile node/foreign agent relationship. Such a static method of providing encryption keys is highly impractical. Alternatively, an encryption key for communications between the mobile node 12 and the foreign agent 16 could be provided by using a public key authentication or a digital signature. However, both of these methods rely upon a preexisting secure communication pathway between the mobile node 12 and an IKE or PKI provider and therefore are inefficient from the standpoint of time and cost.

Thus, existing methods for providing secure communications in a communication network do not permit the security associations between the entities in the network to be dynamically configured, renewed, or reset. Furthermore, the existing methods for providing secure communications in a communication network are slow and inefficient.

The present invention is directed to improving user security in communication networks.

SUMMARY OF THE INVENTION

According to one aspect of the present invention, a system for providing secure communication of messages between a mobile node and a home domain using a foreign domain is provided that includes means for transmitting a registration request from the mobile node to the home domain, the request comprising an identity of the mobile node in encrypted form and network routing information in non-encrypted form, means for processing the registration request from the mobile node within the home domain and generating a registration reply comprising one or more encryption keys for encrypting messages to be communicated between and among the mobile node, home domain, and the foreign domain, and means for transmitting the registration reply from the home domain to the foreign domain and the mobile node.

According to another aspect of the present invention, a method of providing secure communication between a mobile node and a home domain using a foreign domain is provided that includes transmitting a registration message from the mobile node to the home domain, the message comprising an identity of a user of the mobile node in encrypted form and network routing information in non-encrypted form, the home domain receiving and processing the registration message to generate a registration reply comprising one or more encryption keys for encrypting data to be communicated between and among the mobile node, home domain, and the foreign domain, and transmitting the registration reply from the home domain to the foreign domain and the mobile node.

According to another aspect of the present invention, a communications network is provided that includes a home domain, a foreign domain operably coupled to the home domain, and a mobile node operably coupled to the foreign domain. The mobile node is adapted to generate and transmit a registration request to the foreign domain, the registration request including an identity of the mobile node in encrypted form and network routing information in non-encrypted form. The foreign domain is adapted to relay the registration request to the home domain. The home domain is adapted to receive the registration request and generate encryption keys for encrypting data to be communicated between and among the home domain, the foreign domain, and the mobile node.

According to another aspect of the present invention, a method of providing secure communications between a mobile node and a home domain using a foreign domain in a communications network is provided that includes the home domain authenticating the mobile node and the foreign domain, and transmitting data between the mobile node and the home domain through the foreign domain.

According to another aspect of the present invention, a registration request message for use in registering a mobile node and a foreign domain with a home domain in a communications network is provided that includes a network address for the home domain and a network address for the mobile node. The home domain and the mobile node share an encryption key for encrypting messages, and the network address for the mobile node is encrypted using the shared encryption key.

According to another aspect of the present invention, a registration reply message for use in registering a mobile node and a foreign domain with a home domain in a communications network is provided that includes encryption keys for encrypting data to be communicated between and among the mobile node, the home domain, and the foreign domain. The mobile node and the home domain share an encryption key for encrypting messages, and the encryption keys for encrypting data to be communicated between the mobile node and one or more of the home domain and the foreign domain are encrypted using the shared encryption key.

According to another aspect of the present invention, a computer program for implementing a method of providing secure communication between a mobile node and a home domain using a foreign domain is provided that includes a storage medium, and instructions stored in the storage medium for: transmitting a registration message from the mobile node to the home domain, the message comprising an identity of a user of the mobile node in encrypted form and network routing information in non-encrypted form, the home domain receiving and processing the registration message to generate a registration reply comprising one or more encryption keys for encrypting messages to be communicated between and among the mobile node, home domain, and the foreign domain, and transmitting the registration reply from the home domain to the foreign domain and the mobile node.

According to another aspect of the present invention, a communications network is provided that includes an initiator, a responder, and means for establishing a security association between the initiator and the responder.

According to another aspect of the present invention, a method of providing secure communications between an initiator and a responder in a communications network is provided that includes establishing a security association between the initiator and the responder.

According to another aspect of the present invention, a computer program for providing secure communications between an initiator and a responder in a communications network is provided that includes a storage, and instructions recorded in the storage for establishing a security association between the initiator and the responder.

According to another aspect of the present invention, a protocol extension message for negotiating a security association between an initiator and a responder in a communications network is provided that includes a security association payload for negotiating the security association, one or more proposal payloads for defining the security association including one or more transforms, one or more transform payloads for defining the transforms, and one or more key exchange payloads for defining encryption keys used in the transforms.

According to another aspect of the present invention, a method of providing an encryption key for securing communications between an initiator and a responder in a communications network is provided that includes the initiator generating an initiator Diffie-Hellman computed value, the initiator transmitting the initiator Diffie-Hellman computed value to the responder, the responder generating the encryption key and a responder Diffie-Hellman computed value, the responder transmitting the responder Diffie-Hellman computed value to the initiator, and the initiator generating the encryption key.

According to another aspect of the present invention, a method of providing encryption keys for use in securing communications between an initiator and a responder in a communications network is provided that includes providing a predefined shared secret to the initiator and responder, generating an encryption key for securing communications between the initiator and responder, encrypting the encryption key for securing communications between the initiator and responder using the predefined shared secret, and transmitting the encrypted encryption key for securing communications between the initiator and responder to the initiator and responder.

According to another aspect of the present invention, a method of generating an encryption key for use in securing communications between an initiator and a responder in a communications network is provided that includes generating an initial encryption key, and generating an encryption key for securing communications between the initiator and the responder as a pseudo random function of the initial encryption key.

According to another aspect of the present invention, a communications network is provided that includes an encryption key distribution center for generating an initial encryption key, an initiator operably coupled to the encryption key distribution center, and a responder operably coupled to the initiator. The encryption key for securing communications between the initiator and the responder is generated as a pseudo random function of the initial encryption key.

According to another aspect of the present invention, a communications network is provided that includes means for generating an initial encryption key, an initiator operably coupled to the means for generating the initial encryption key, a responder operably coupled to the initiator, and means for generating an encryption key for securing communications between the initiator and the responder as a pseudo random function of the initial encryption key.

According to another aspect of the present invention, a computer program for generating an encryption key for use in securing communications between an initiator and a responder in a communications network that includes a storage, and instructions stored in the storage for: generating an initial encryption key, and generating an encryption key for securing communications between the initiator and the responder as a pseudo random function of the initial encryption key.

According to another aspect of the present invention, a method of establishing a security association between an initiator and a responder in a communication network is provided that includes the initiator proposing a security association and the responder responding the proposal.

According to another aspect of the present invention, a communication network is provided that includes an initiator, a responder operably coupled to the initiator, means for proposing a security association between the initiator and the responder, and means for responding to the proposed security association.

According to another aspect of the present invention, a communication network is provided that includes an initiator, and a responder operably coupled to the initiator. The initiator is adapted to propose a security association between the initiator and the responder, and the responder is adapted to respond to the proposed security association.

According to another aspect of the present invention, a computer program for establishing a security association between an initiator and a responder in a communication network is provided that includes a storage medium, and instructions recorded in the storage medium for the initiator proposing a security association, and the responder responding the proposal.

The present embodiments of the invention provide a number of advantages. For example, the system and method provide user confidentiality during the authentication process. In addition, the system and method provide centralized encryption key generation and distribution thereby providing easier management. Furthermore, the system and method provide centralized key generation and distribution on a real-time basis thereby providing proactive key distribution. In addition, the system and method is implementable using extensions to existing IP communications protocols such as, for example, mobile IP. Furthermore, the mobile nodes, the foreign agents, and the foreign domains are authenticated before the start of message transmissions thereby maintaining a high level of security. In addition, the mobile node and the user's personal information is protected from detection during the initial registration and authentication phase.

Furthermore, the encryption keys are distributed such that secure communication pathways using the keys are established for a particular mobile node and are not shared by another mobile node. In addition, the system and method permit the security association between entities in the network to be dynamically configured thereby providing a rapid and efficient method of providing secure communications in a network.

BRIEF DESCRIPTION OF THE DRAWINGS

FIG. 14a is a schematic illustration of an embodiment of the transmission of a registration request by the mobile node to the foreign agent of the communications network of FIG. 12.

FIG. 14b is a schematic illustration of an embodiment of the relay of the registration request from the foreign agent to the foreign AAA server in the communications network of FIG. 12.

FIG. 14c is a schematic illustration of an embodiment of the relay of the registration request by the foreign AAA server to the home AAA server in the communications network of FIG. 12.

FIG. 14d is a schematic illustration of an embodiment of the relay of the registration request by the home AAA server to the home agent in the communications network of FIG. 12.

FIG. 15a is a schematic illustration of an embodiment of the transmission of a registration reply by the home agent to the home AAA server in the communications network of FIG. 12.

FIG. 15b is a schematic illustration of an embodiment of the relay of the registration reply from the home AAA server to the foreign AAA server in the communications network of FIG. 12.

FIG. 15c is a schematic illustration of an embodiment of the relay of the registration reply by the foreign AAA server to the foreign agent in the communications network of FIG. 12.

FIG. 15d is a schematic illustration of an embodiment of the relay of the registration reply by the foreign agent to the mobile node in the communications network of FIG. 11.

DESCRIPTION OF THE ILLUSTRATIVE EMBODIMENTS

A system and method for providing secure communications in a communication network is provided in which the security associations between the entities in the communication network can be dynamically configured and negotiated. Furthermore, the security associations can have a defined finite lifetime and they can be renewed. In this manner, secure communications in a communication network can be provided in an efficient and cost effective manner.

Figure 1:
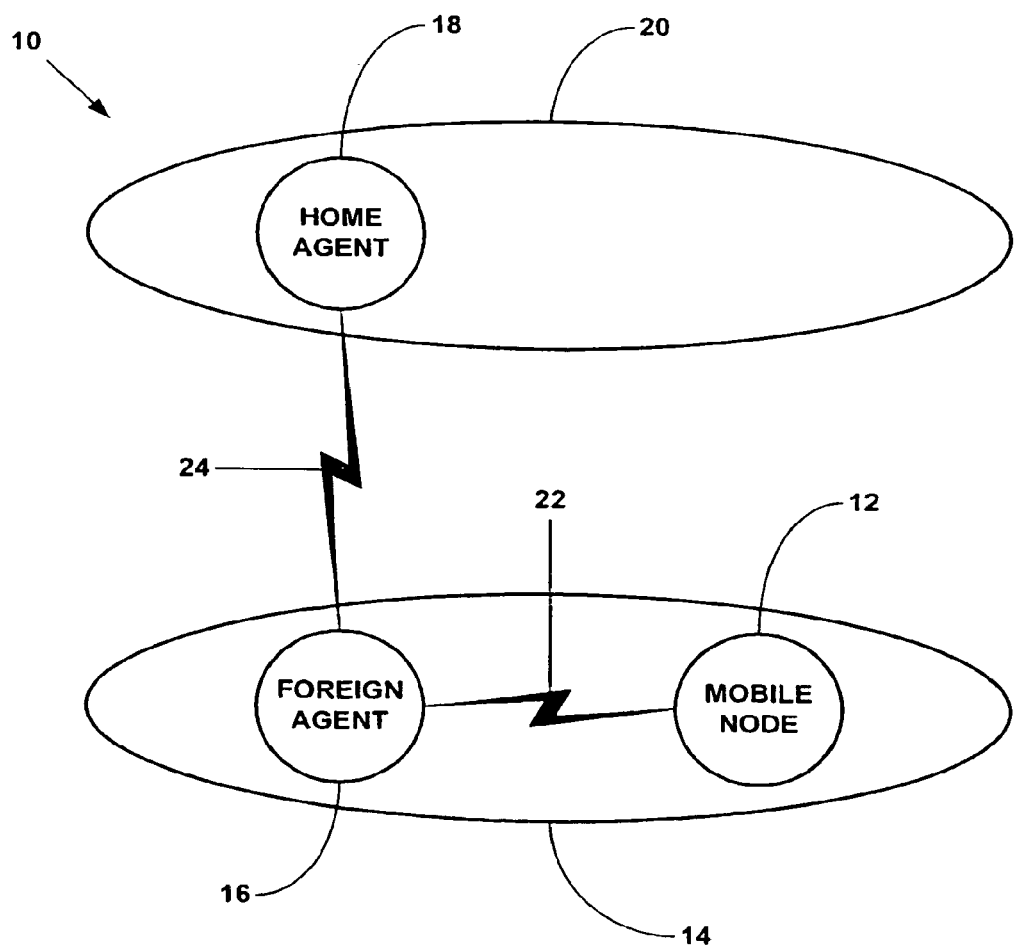
FIG. 1 is a schematic illustration of an embodiment of a communications system.
Figure 2:
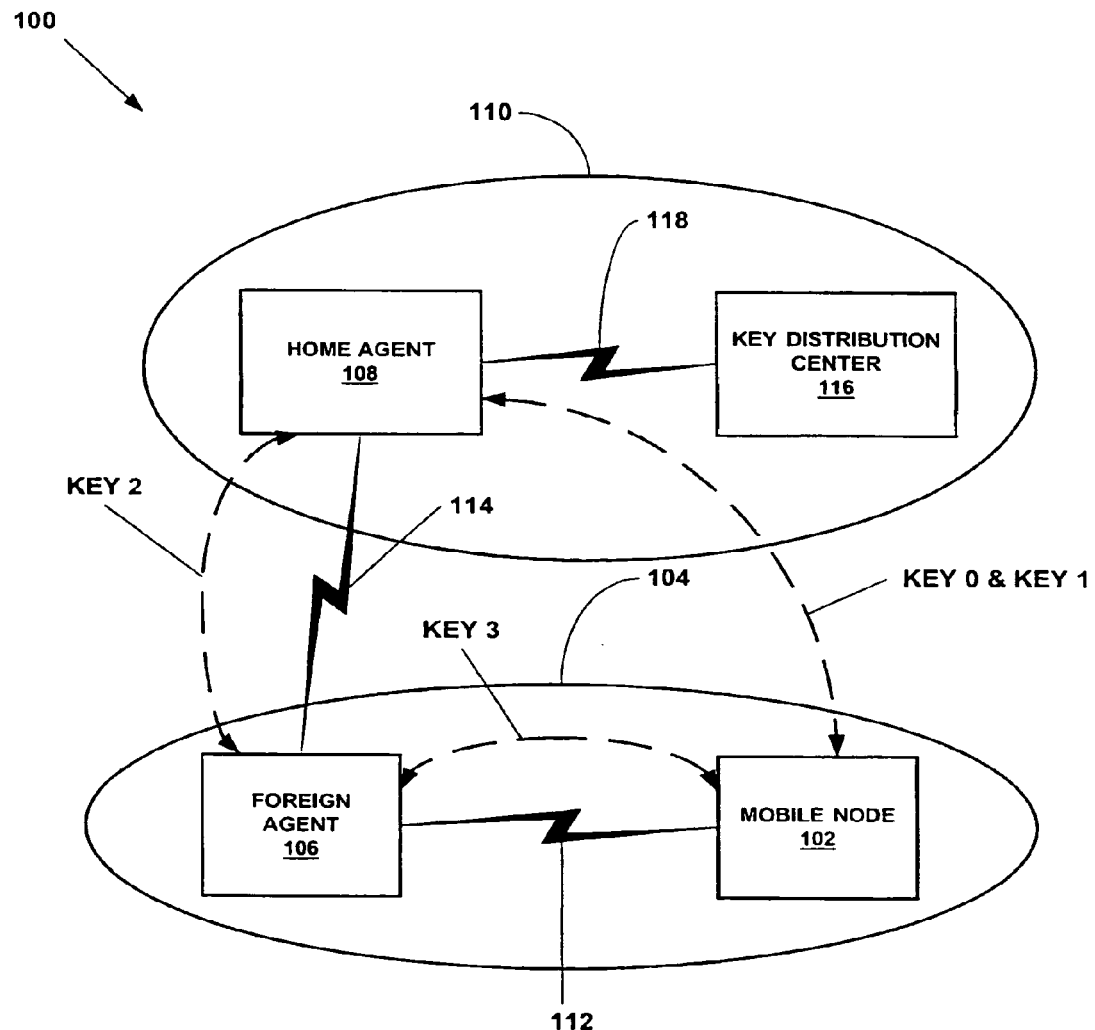
FIG. 2 is a schematic illustration of an embodiment of a communications system for providing secure communications.

Referring to FIG. 2, the reference numeral 100 refers, in general, to a communications network according to an embodiment of the invention that includes a mobile node 102 positioned within a foreign domain 104 that is serviced by a foreign agent 106. The foreign agent 106 is operably coupled to the mobile node 102 and a home agent 108 for servicing a home domain 110 by communication pathways, 112 and 114, respectively. The home agent 108 is operably coupled to a key distribution center 116 by a communication pathway 118. Communication between the mobile node 102, foreign agent 106, home agent 108, and key distribution center 116 may be provided by a conventional IP communications protocol such as, for example, TCP/IP.

During operation, the mobile node 102 and the home agent 108 use a predefined encryption key KEY 0, or other shared secret, to permit information transmitted between the mobile node and home agent to be encrypted. In this manner, the mobile node 102 and the home agent 108 can always communicate regardless of the security of the intermediate communication pathways. In addition, in this manner, as the mobile node 102 roams over foreign domains, the mobile node can always be authenticated and registered by the home agent 108. Furthermore, in this manner, the transmission of messages in the communication system 100, following the registration and authentication of the mobile node 102, can be facilitated by the central distribution of encryption keys by the key distribution center 116. In an exemplary embodiment of the communication system 100, messages communicated between the mobile node 102 and the home agent 108 are encrypted using an encryption key KEY 1, messages communicated between the home agent 108 and the foreign agent 106 are encrypted using an encryption key KEY 2, and messages communicated between the mobile node 102 and the foreign agent 106 are encrypted using an encryption key KEY 3.

Figure 3A:
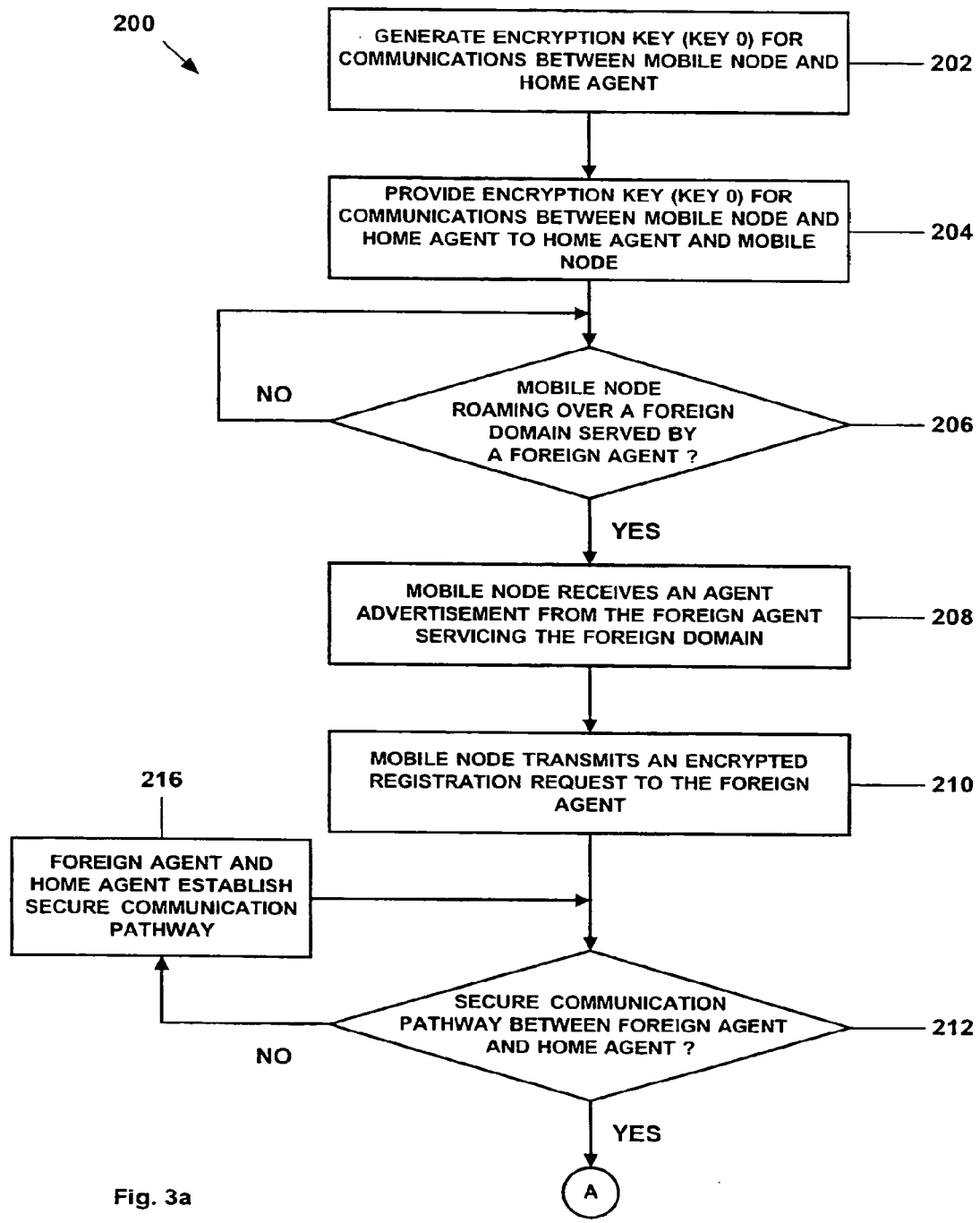
FIGS. 3a and 3b are a flow chart illustration of an embodiment of a method of providing secure communications in the communications network of FIG. 2.
Figure 3B:
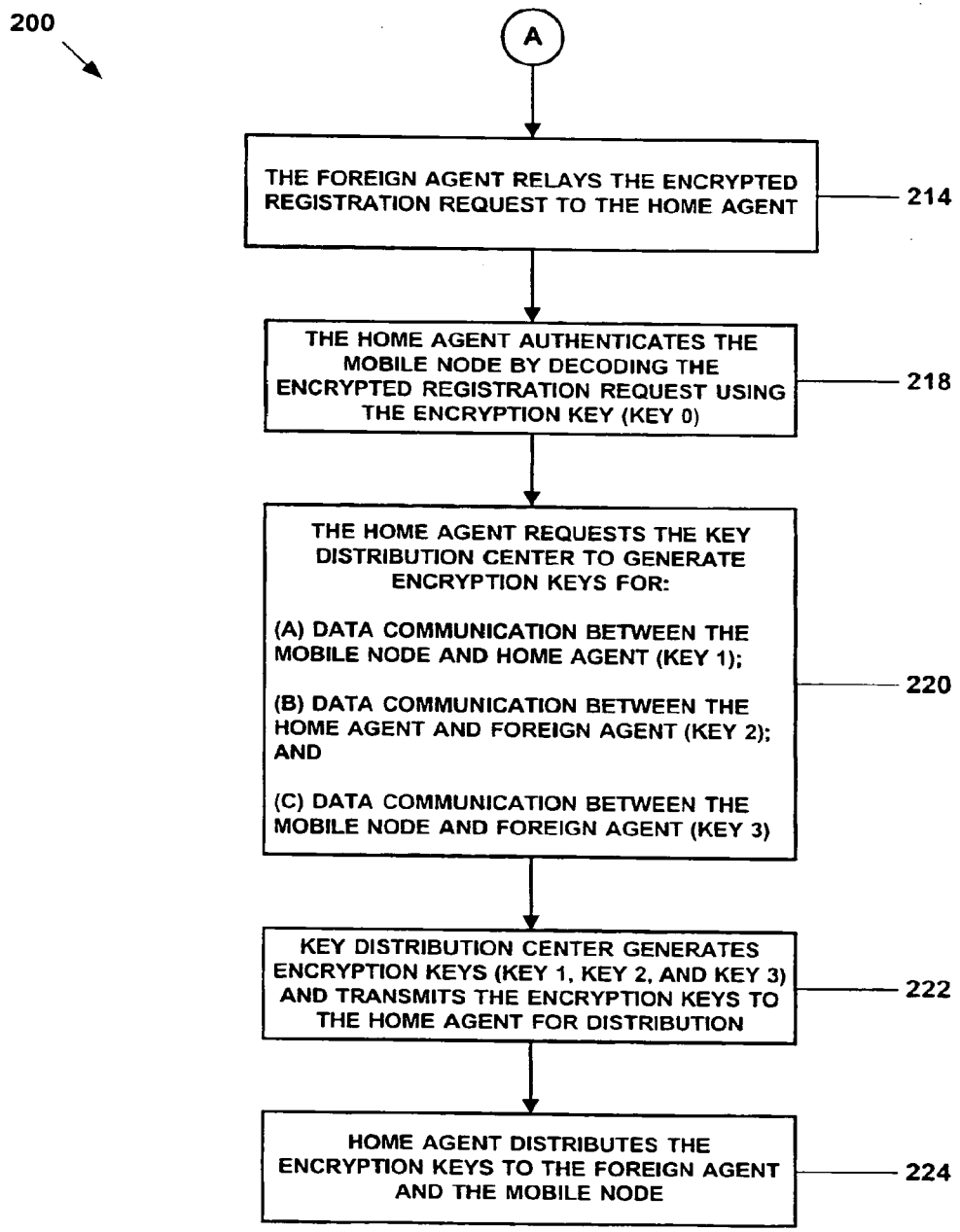

Referring to FIGS. 3a-3b, in an exemplary embodiment, the encryption keys, KEY1, KEY2, and KEY3, are generated by a process 200 in which, in step 202, the key distribution center 116 generates an encryption key KEY 0 for use by the mobile node 102 and the home agent 108 for encrypting information transmitted between the mobile node and the home agent. The encryption key KEY 0 is then provided to the mobile node 102 and the home agent 108 during an initialization process in step 204. In this manner, the mobile node 102 and the home agent 108 can always securely communicate with each other in a secure manner regardless of the security level of the intermediate communication pathways.

During operation, the mobile node 102 may roam over the foreign domain 104 that is serviced by the foreign agent 106. If the mobile node 102 roams over the foreign domain 104 that is serviced by the foreign agent 106 in step 206, then the mobile node 102 may receive a foreign agent advertisement from the foreign agent. The foreign agent advertisement may include, for example, information that specifies the identity of the foreign agent and the foreign domain such as the IP address for the foreign agent in step 208.

Figure 4A:
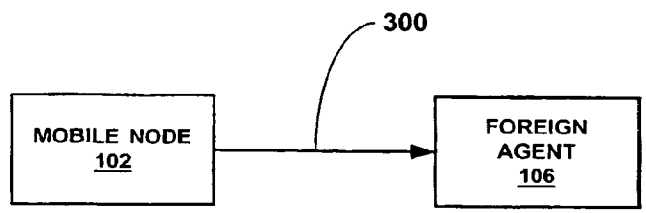
FIG. 4a is a schematic illustration of an embodiment of the transmission of a registration request by the mobile node to the foreign agent of the communications network of FIG. 2.
Figure 5:
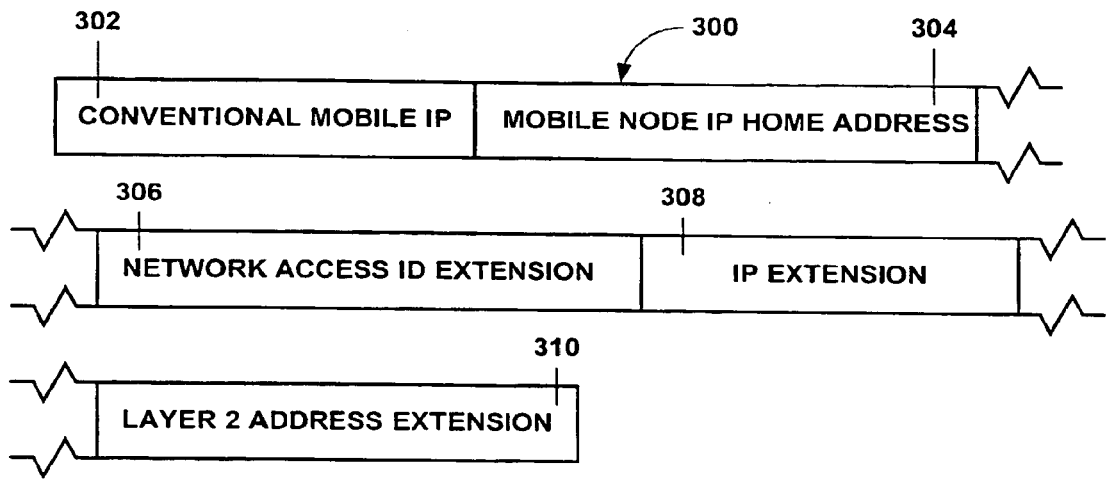
FIG. 5 is a schematic illustration of an embodiment of a registration request for use in the communications network of FIG. 2.

As illustrated in FIG. 4a, upon receiving the foreign agent advertisement, the mobile node 102 may then transmit an encrypted registration request 300 to the foreign agent 106 using the communication pathway 112 in step 210. In an exemplary embodiment, as illustrated in FIG. 5, the registration request 300 includes conventional mobile IP 302 for directing the registration message 300 to the home agent 108, a mobile node IP home address 304, a mobile node network access identification (NAI) extension 306, an IP extension 308, and a layer 2 address extension 310. In an exemplary embodiment, the mobile IP home address 304, the mobile node NAI extension 306, the IP extension 308, and the layer 2 address extension 310 are encrypted using the encryption key KEY 0. Since the private portions of the registration request 300 are encrypted using the key KEY 0, the foreign agent 106 cannot read any of the private information contained in the registration request 300 such as, for example, the mobile IP home address 304 or the mobile node NAI extension 306. In this manner, the identity of the mobile node 102 is fully hidden from the foreign agent 106 until the home agent 108 authenticates the foreign domain 104 and foreign agent using the registration request transmitted by the mobile node.

Figure 4B:
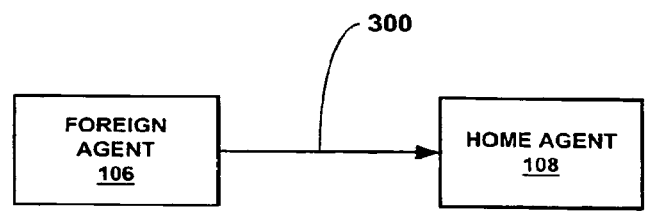
FIG. 4b is a schematic illustration of an embodiment of the relay of the registration request by the foreign agent to the home agent in the communications network of FIG. 2.

As illustrated in FIG. 4b, if the communication pathway 114 between the foreign agent 106 and the home agent 108 is secure, then the foreign agent 106 may relay the encrypted registration request 300 to the home agent 108 in steps 212 and 214. If the communication pathway 114 between the foreign agent 106 and the home agent 108 is not secure, then the foreign agent and home agent may secure the communication pathway in a conventional manner by, for example, an independent key exchange (IKE), in steps 212 and 216. Once the communication pathway 114 has been secured, then the foreign agent 106 may relay the encrypted registration request 300 to the home agent 106 in steps 212 and 214.

Upon receiving the encrypted registration request, the home agent 108 may then authenticate the mobile node 102, the foreign domain 104, and the foreign agent 106 by decrypting the encrypted registration request using the encryption key KEY 0 in step 218. After registration of the mobile node 102 with the home agent 108, the home agent requests the key distribution center 116 to generate the encryption keys, KEY 1, KEY 2, and KEY 3 in step 220. The key distribution center 116 then generates the encryption keys, KEY 1, KEY 2, and KEY 3, and transmits the encryption keys to the home agent 108 for distribution to the mobile node 102 and foreign agent 106 in step 222.

Figure 4C:
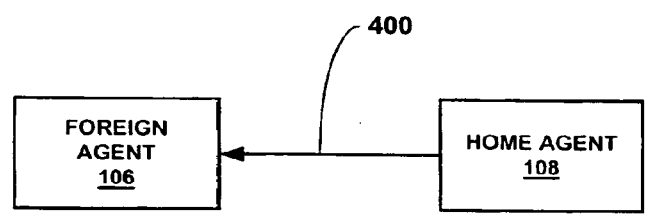
FIG. 4c is a schematic illustration of an embodiment of the transmission of a registration reply by the home agent to the foreign agent of the communications network of FIG. 2.
Figure 4D:
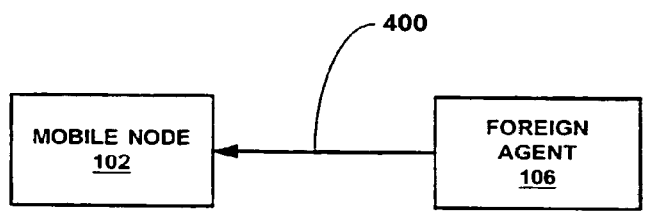
FIG. 4d is a schematic illustration of an embodiment of the relay of the registration reply by the foreign agent to the mobile node in the communications network of FIG. 2.
Figure 6:
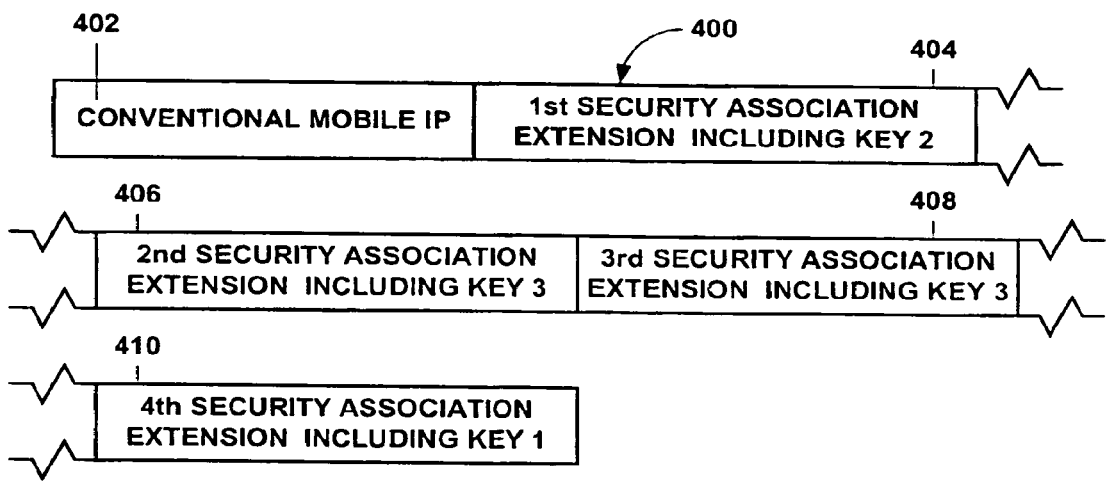
FIG. 6 is a schematic illustration of an embodiment of a registration reply for use in the communications network of FIG. 2.

As illustrated in FIGS. 4c, 4d, and 6, in step 224, the home agent 108 may distribute the encryption keys, KEY 1, KEY 2, and KEY 3, to the mobile node 102 and the foreign agent 106 by transmitting a registration reply 400 that, in an exemplary embodiment, includes conventional mobile IP 402 for directing the registration reply 400 to the mobile node 102, a first security association (SA) extension 404 including the encryption key KEY 2 in unencrypted form, a second Security association extension 406 including the encryption key KEY 3 in unencrypted form; a third Security association extension 408 including the encryption key KEY 3 in encrypted form using the encryption key KEY 0, and a fourth Security association extension 410 including the encryption key KEY 1 in encrypted form using the encryption key KEY 0. The security association generally refers to security parameters used for providing secure communications in the system 100 including, for example, shared secret encryption keys, and other security attributes. In an exemplary embodiment, the system 100 uses a security parameters index (SPI) to index the security associations used by the system 100 in a database maintained and controlled by the home agent 108 and/or the key distribution center 116.

The foreign agent 106 receives the registration reply 300 and extracts the first and second Security association extensions, 404 and 406, including the encryption keys KEY 2 and KEY 3 in unencrypted form. The mobile node 102 then receives the registration reply 400 and extracts the third and fourth Security association extensions, 408 and 410, including the encryption keys KEY 3 and KEY 1 in encrypted form. The mobile node 102 then decrypts the encrypted form of the encryption keys KEY 3 and KEY 1 using the encryption key KEY 0.

Figure 7:
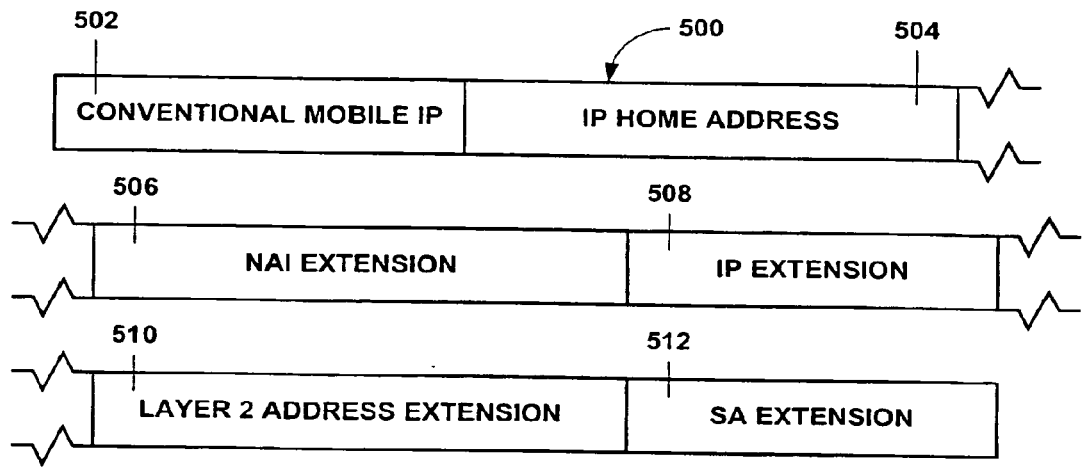
FIG. 7 is a schematic illustration of an embodiment of a general purpose communication message for use in the communications network of FIG. 2.

Referring to FIG. 7, in an exemplary embodiment, the mobile node 102, foreign agent 106, home agent 108, and key distribution center 116 communicate with one another using a general purpose communication message 500 that includes standard mobile IP 502, an IP home address 504, a general purpose network access identifier extension 506, a general purpose IP extension 508, a general purpose layer 2 address extension 510, and a general purpose Security association extension 512.

More generally, the encryption keys, KEY 0, KEY 1, KEY 2, and KEY 3, may be security associations that define the security parameters of the communications between the respective entities of the network 100.

Figure 8:
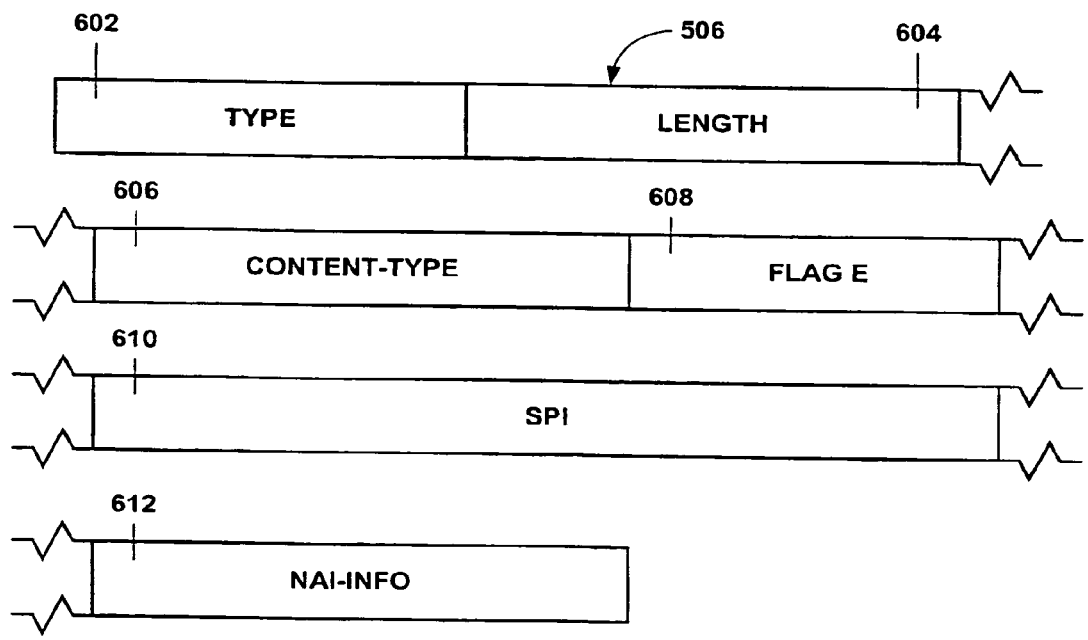
FIG. 8 is a schematic illustration of an embodiment of a general purpose network access identifier extension for use in the general purpose communication message of FIG. 7.

Referring to FIG. 8, in an exemplary embodiment, the general purpose network access identifier extension 506 includes a type field 602, a length field 604, a content-type field 606, a flag E field 608, a security parameters index (SPI) field 610, and an NAI-INFO field 612. The type field 602 indicates the type of network access identifier extension, and the length field 604 indicates the length of the NAI-INFO field 612. The content-type field 614 indicates the type of entity that owns the network access identifier. In an exemplary embodiment, a 0 indicates that the network access identifier is owned by a mobile node, a 1 indicates that the network access identifier is owned by a foreign agent, and a 2 indicates that the network access identifier is owned by a home agent. In an exemplary embodiment, if the flag E field 608 contains a 1, then the contents of the NAI-INFO field 612 are encrypted. The contents of the SPI field 610 defines the encryption key and the type of encryption algorithm that are used to encrypt the NAI-INFO field 612. The NAI-INFO field contains the network access identifier string in an encrypted or regular string format.

Figure 9:
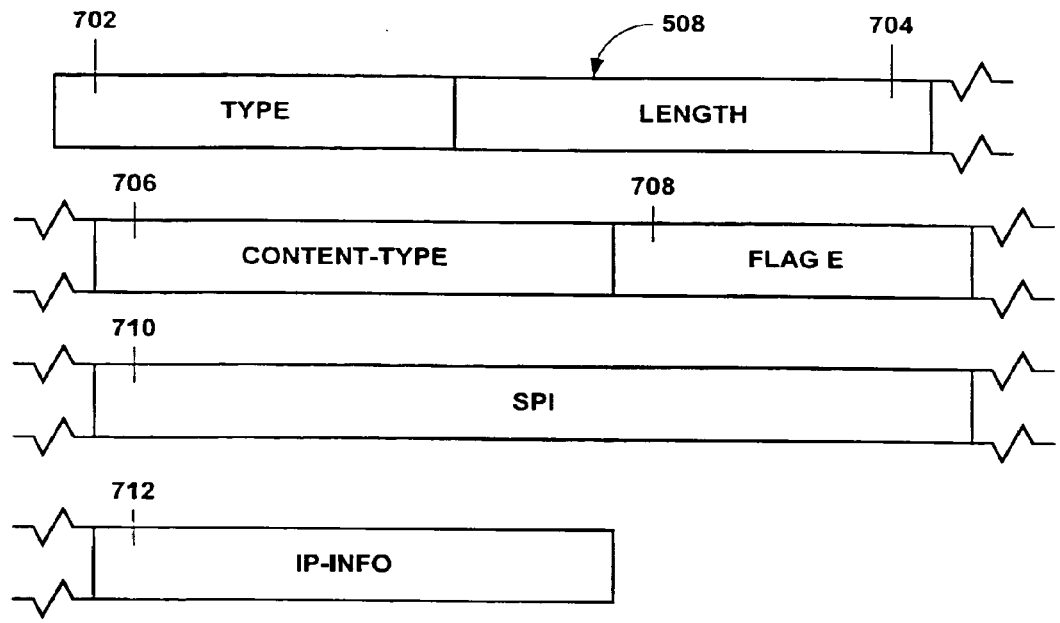
FIG. 9 is a schematic illustration of an embodiment of a general purpose IP extension for use in the general purpose communication message of FIG. 7.

Referring to FIG. 9, in an exemplary embodiment, the general purpose IP extension 508 includes a type field 702, a length field 704, a content-type field 706, a flag E field 708, a security parameters index (SPI) field 710, and an IP-INFO field 712. The type field 702 indicates the type of IP extension, and the length field 704 indicates the length of the IP-INFO field 712. The content-type field 714 indicates the type of entity that owns the IP address. In an exemplary embodiment, a 0 indicates that the IP address is owned by a mobile node and/or a home agent, and a 1 indicates that the IP address is owned by a router. In an exemplary embodiment, if the flag E field 708 contains a 1, then the contents of the IP-INFO field 712 are encrypted. The contents of the SPI field 710 defines the encryption key and the type of encryption algorithm that are used to encrypt the IP-INFO field 712. The IP-INFO field contains the IP address in an encrypted or regular format.

Figure 10:
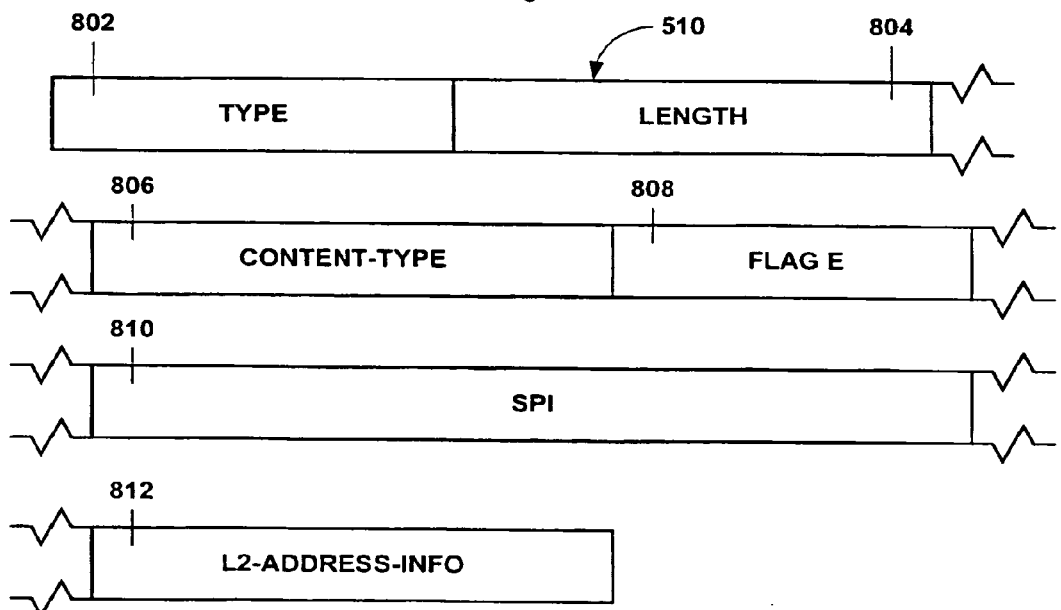
FIG. 10 is a schematic illustration of an embodiment of a general purpose layer 2 address extension for use in the general purpose communication message of FIG. 7.

Referring to FIG. 10, in an exemplary embodiment, the general purpose layer 2 (L2) extension 510 includes a type field 902, a length field 904, a content-type field 906, a flag E field 908, a security parameters index (SPI) field 910, and an L2-ADDRESS-INFO field 912. The type field 902 indicates the type of layer 2 extension, and the length field 904 indicates the length of the L2-ADDRESS-INFO field 912. The content-type field 914 indicates the type of layer 2 addresses included in the extension. In an exemplary embodiment, a 0 indicates that an Ethernet address, a 1 indicates an International Mobile Subscriber Identity (IMSI) address, and a 2 indicates a Mobile Identification Number (MIN) address. In an exemplary embodiment, if the flag E field 908 contains a 1, then the contents of the L2-ADDRESS-INFO field 912 are encrypted. The contents of the SPI field 910 defines the encryption key and the type of encryption algorithm that are used to encrypt the L2-ADDRESS-INFO field 912. The L2-ADDRESS-INFO field contains the layer 2 address in an encrypted or regular format.

Figure 11:
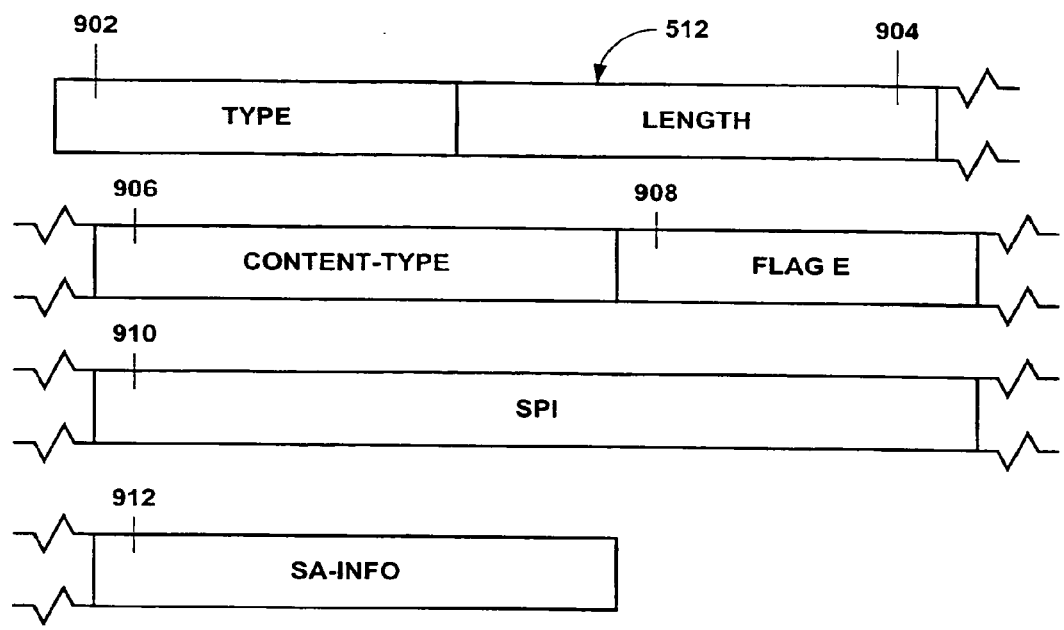
FIG. 11 is a schematic illustration of an embodiment of a general purpose security association extension for use in the general purpose communication message of FIG. 7.

Referring to FIG. 11, in an exemplary embodiment, the general purpose security association extension 512 includes a type field 902, a length field 904, a content-type field 906, a flag E field 908, a security parameters index (SPI) field 910, and an SA-INFO field 912. The type field 902 indicates the type of Security association extension, and the length field 904 indicates the length of the SA-INFO field 912. The content-type field 914 indicates the type of entity that owns the IP address. In an exemplary embodiment, a 0 indicates that a mobile node and/or a foreign agent own the IP address, and a 1 indicates that a foreign agent and/or a home agent own the IP address. In an exemplary embodiment, if the flag E field 908 contains a 1, then the contents of the SA-INFO field 912 are encrypted. The contents of the SPI field 910 defines the encryption key and the type of encryption algorithm that are used to encrypt the SA-INFO field 912. The SA-INFO field contains the information necessary to establish security association such as, for example, a security parameters index (SPI), a private key, and the type of algorithm needed for encryption and decryption.

More generally, the system 100 may include a plurality of mobile nodes 102, foreign domains 104, foreign agents 106, home agents 108, communication pathways, 112,114 and 118, and key distribution centers 116. In the general application of the system 100, all of the encryption keys are unique thereby providing security for all communication pathways and entities.

Figure 12:
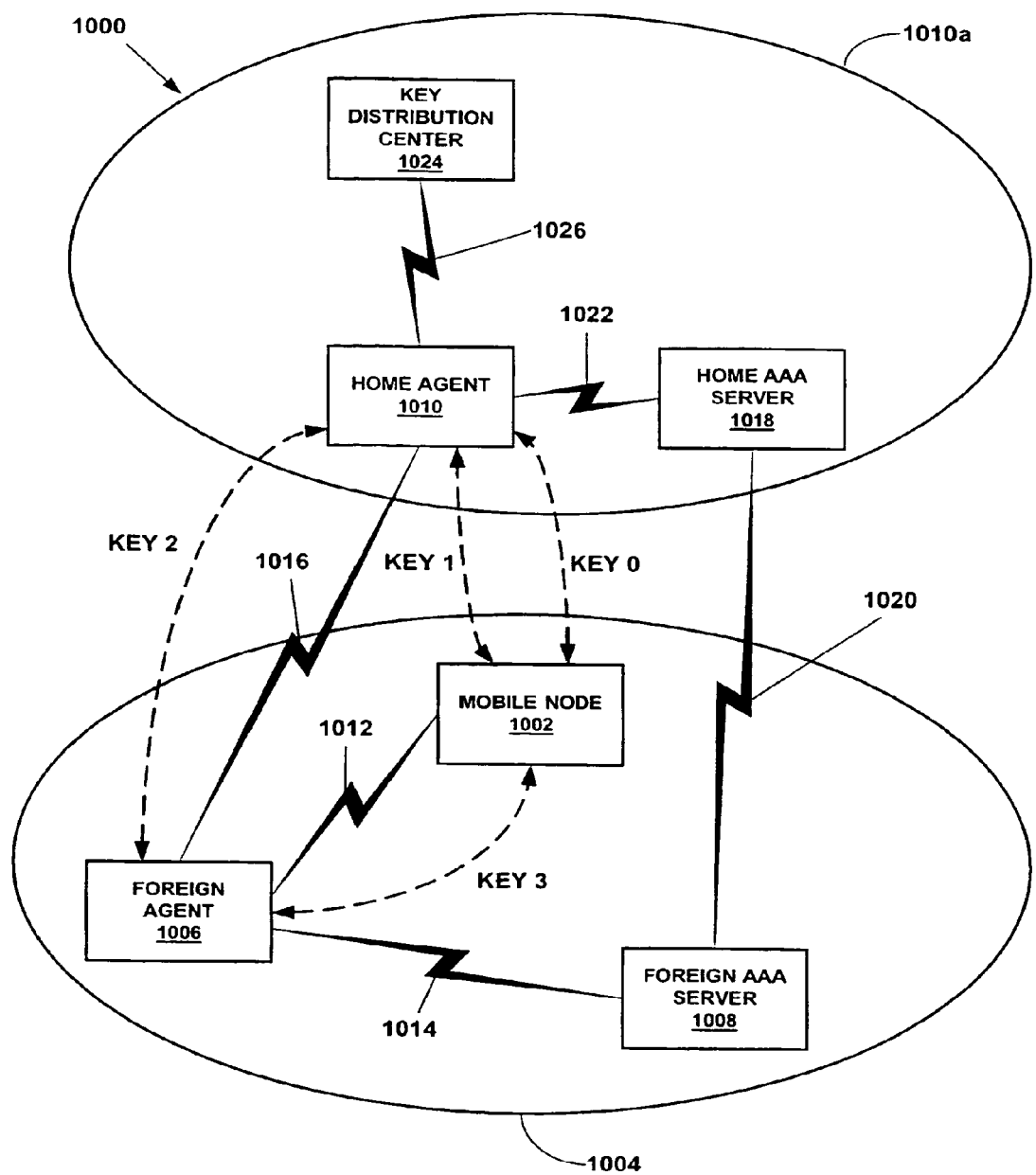
FIG. 12 is a schematic illustration of another embodiment of a communications system for providing secure communications.
Figure 13A:
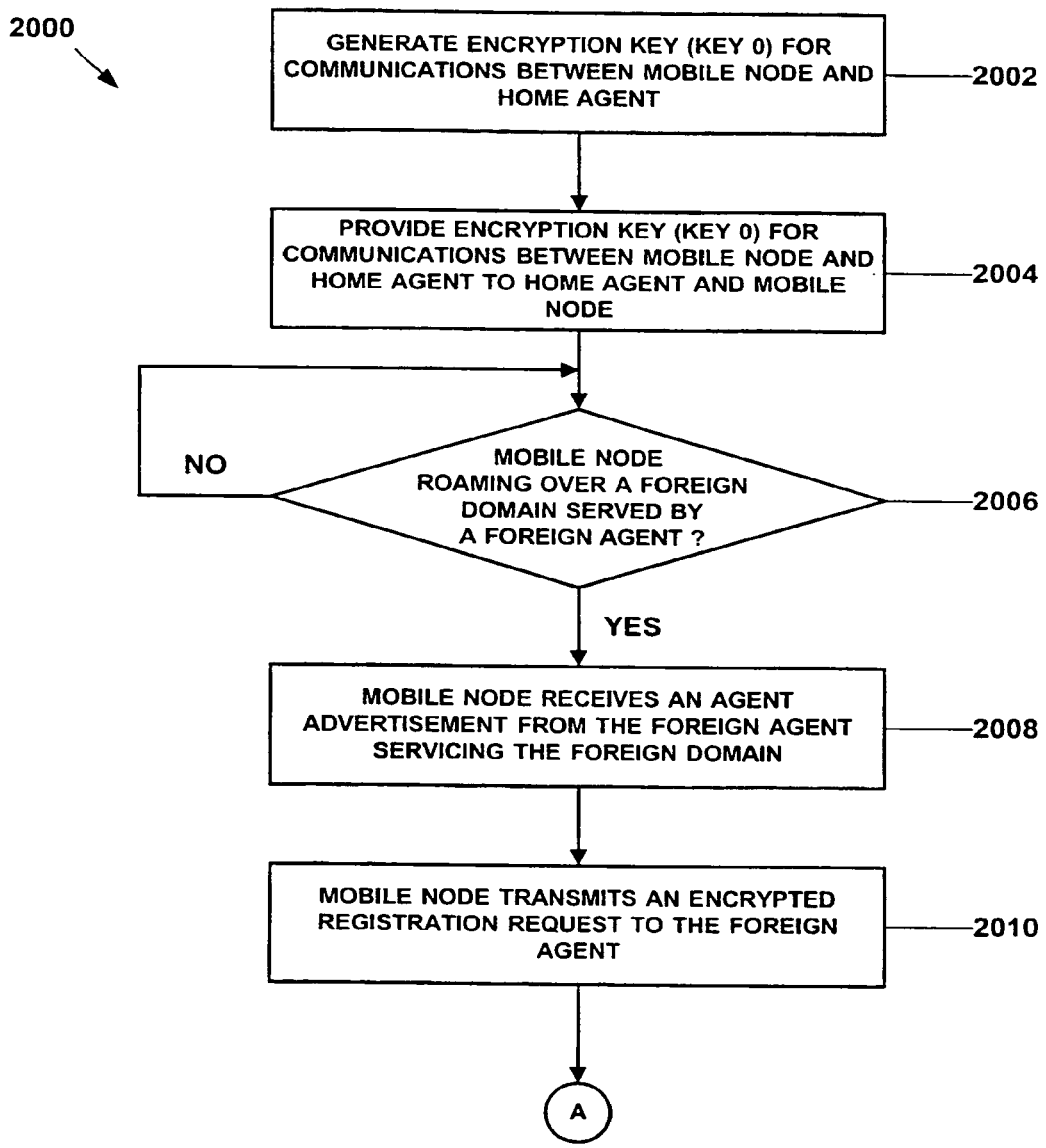
FIGS. 13a-13d are a flow chart illustration of an embodiment of a method of providing secure communications in the communications network of FIG. 12.
Figure 13B:
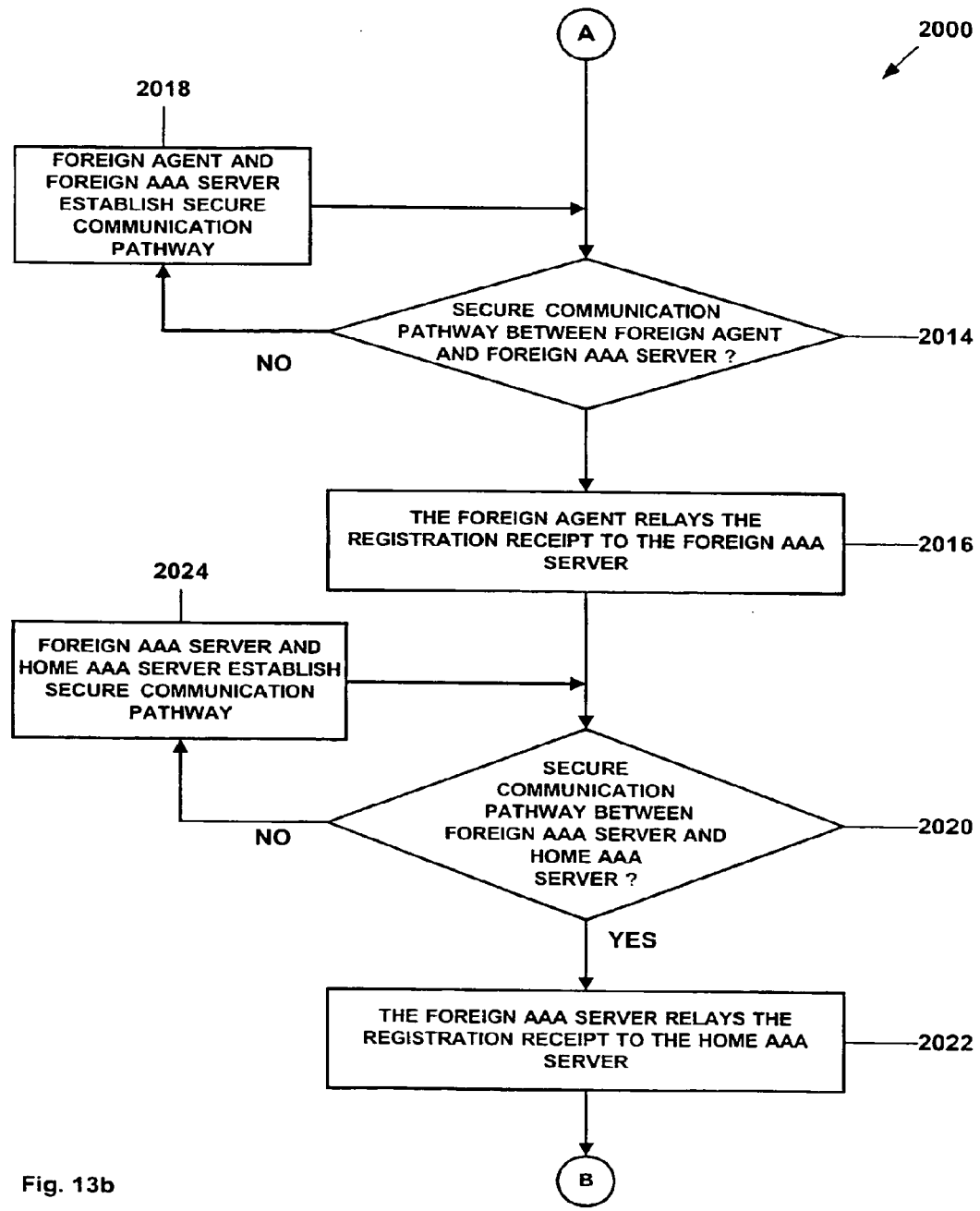
Figure 13C:
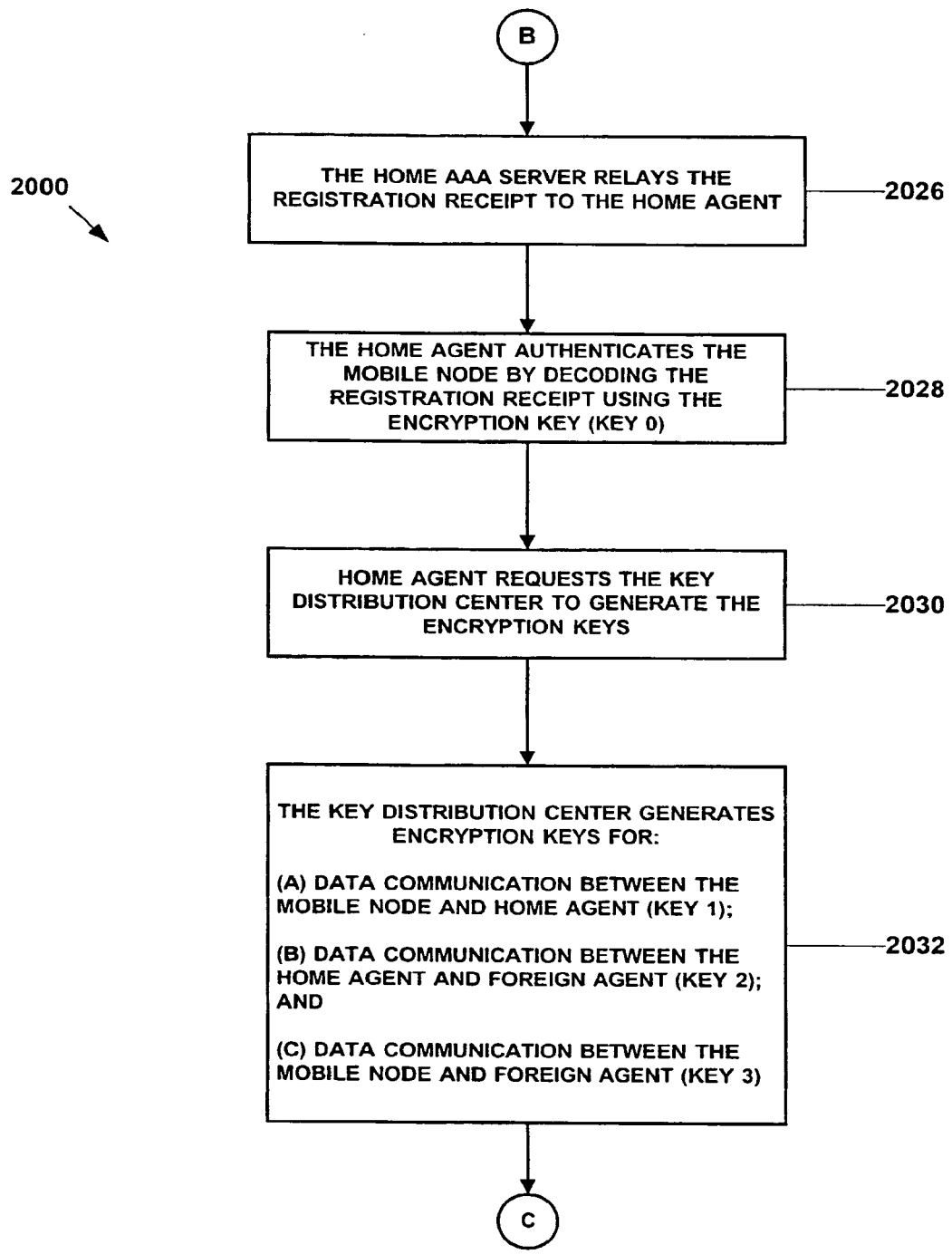
Figure 13D:
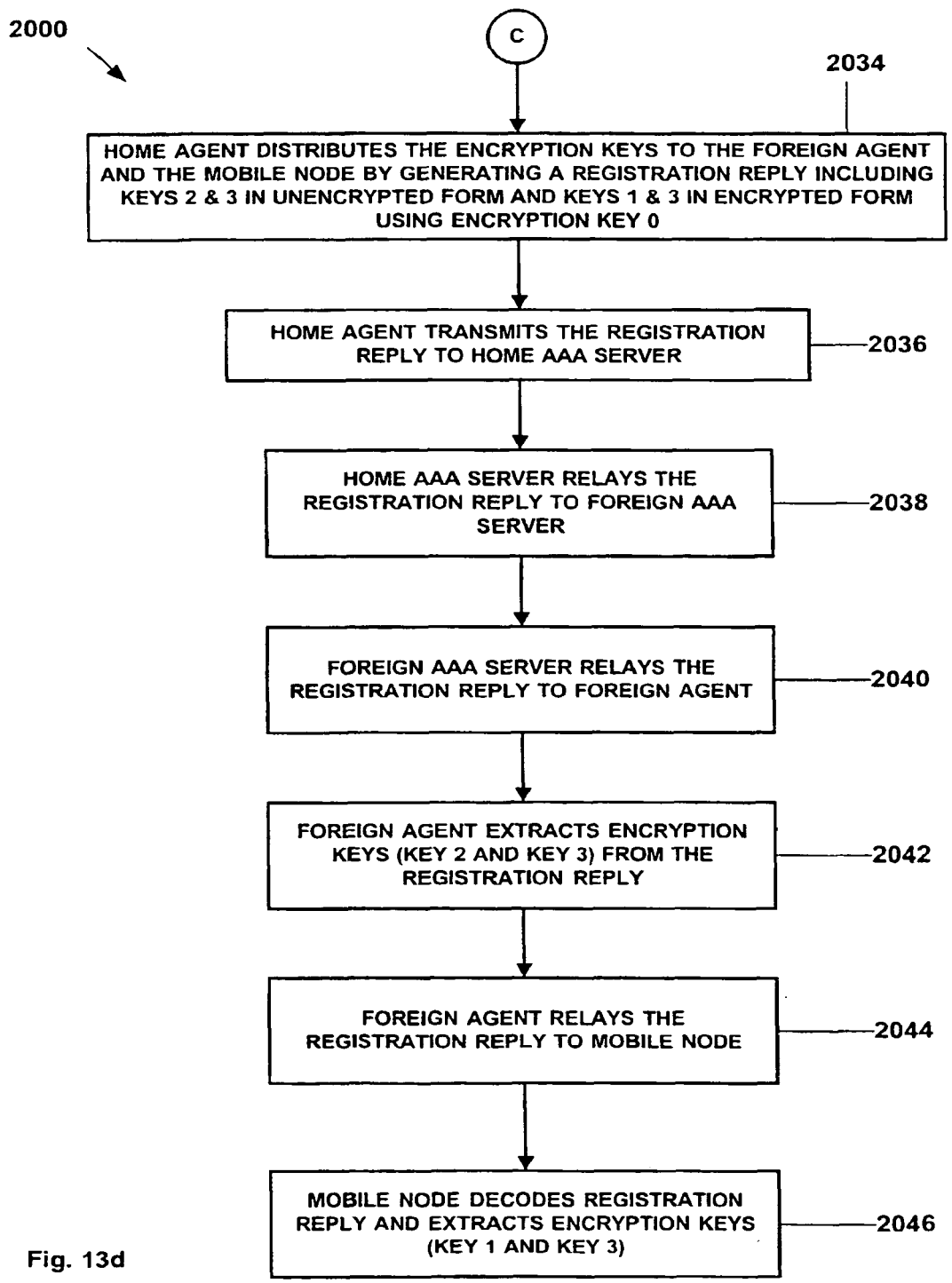

Referring initially to FIG. 12, an alternative embodiment of a communication system 1000 includes a mobile node 1002 positioned within a foreign domain 1004 that is serviced by a foreign agent 1006. The foreign agent 1006 is operably coupled to the mobile node 1002, a foreign authentication, authorization and accounting (AAA) server 1008 positioned within the foreign domain 1004, and a home agent 1010 for servicing a home domain 1010a by communication pathways, 1012,1014, and 1016, respectively. A home AAA server 1018 is operably coupled to the foreign AAA server 1008 and the home agent 1010 by communication pathways, 1020 and 1022, respectively. A central key distribution center 1024 is operably coupled to the home agent 1010 by a communication pathway 1026. Communication between the mobile node 1002, foreign agent 1006, foreign AAA server 1008, home agent 1010, home AAA server 1018, and key distribution center 1024 may be provided by a conventional IP communication protocol such as, for example, TCP/IP.

During operation, the mobile node 1002 and the home agent 1010 use a predefined encryption key KEY 0 to permit information transmitted between the mobile node and home agent to be encrypted. In this manner, the mobile node 1002 and the home agent 1010 can always communicate regardless of the level of security of the intermediate communication pathways. In addition, in this manner, as the mobile node 1002 roams over foreign domains, the mobile node and the foreign domain can always be authenticated and registered by the home agent 1010. Furthermore, in this manner, the transmission of messages in the communication system 1000, following the registration and authentication of the mobile node 1002 and foreign domain 1004, can be facilitated by the central distribution of encryption keys by the key distribution center 1024. In an alternative embodiment, the home AAA server 1018 also provides the functionality of the key distribution center 1024. In an exemplary embodiment of the communication system 1000, messages communicated between the mobile node 1002 and the home agent 1010 are encrypted using an encryption key KEY 1, messages communicated between the home agent 1010 and the foreign agent 1006 are encrypted using an encryption key KEY 2, and messages communicated between the mobile node 1002 and the foreign agent 1006 are encrypted using an encryption key KEY 3.

Referring to FIGS. 13a-13d, in an exemplary embodiment, the encryption keys, KEY1, KEY2, and KEY3, are generated by a process 2000 in which, in step 2002, the key distribution center 1024 generates an encryption key KEY 0 for use by the mobile node 1002 and the home agent 1010 for encrypting information transmitted between the mobile node and the home agent. The encryption key KEY 0 is then provided to the mobile node 1002 and the home agent 1010 during an initialization process in step 2004. In this manner, the mobile node 1002 and the home agent 1010 can always communicate with each other in a secure manner regardless of the security level of the intermediate communication pathways.

During operation, the mobile node 1002 may roam over the foreign domain 1004 that is serviced by the foreign agent 1006. If the mobile node 1002 roams over the foreign domain 1004 that is serviced by the foreign agent 1006 in step 2006, then the mobile node 1002 may receive a foreign agent advertisement from the foreign agent. The foreign agent advertisement may include, for example, information that specifies the identity of the foreign agent and the foreign domain such as, for example, the IP address for the foreign agent in step 2008.

As illustrated in FIG. 14a, upon receiving the foreign agent advertisement, the mobile node 1002 may then transmit an encrypted registration request 3000 to the foreign agent 1006 using the communication pathway 1012 in step 2010. In an exemplary embodiment, the registration request 3000 includes one or more of the general elements and teachings of the registration request 200.

As illustrated in FIG. 14b, if the communication pathway 1014 between the foreign agent 1006 and the foreign AAA server 1008 is secure, then the foreign agent 1006 may relay the registration request 3000 to the foreign AAA server 1008 in steps 2014 and 2016. If the communication pathway 1014 between the foreign agent 1006 and the foreign AAA server 1008 is not secure, then the foreign agent and foreign AAA server may secure the communication pathway in a conventional manner by, for example, an independent key exchange (IKE), in steps 2014 and 2018. Once the communication pathway 1014 has been secured, then the foreign agent 1006 may relay the registration request 3000 to the foreign AAA server 1008 in steps 2014 and 2016.

As illustrated in FIG. 14c, if the communication pathway 1020 between the foreign AAA server 1008 and the home AAA server 1018 is secure, then the foreign AAA server 1008 may relay the registration request 3000 to the home AAA server 1018 in steps 2020 and 2022. If the communication pathway 1020 between the foreign AAA server 1008 and the home AAA server 1018 is not secure, then the foreign AAA server and the foreign AAA server may secure the communication pathway in a conventional manner by, for example, an independent key exchange (IKE), in steps 2020 and 2024. Once the communication pathway 1014 has been secured, then the foreign agent 1006 may relay the registration request 3000 to the foreign AAA server 1018 in steps 2020 and 2022.

Since the private portions of the registration request 3000 are encrypted using the encryption key KEY 0, the foreign agent 1006, foreign AAA server 1008, and home AAA server 1018 cannot read any of the private information contained in the registration request 3000 such as, for example, the user name, the mobile node IP home address, or the mobile node network access identifier. In this manner, the identity of the mobile node 1002 is fully hidden from the foreign agent 1006, the foreign AAA server 1008, and the home AAA server 1018 until the home agent 1010 authenticates the mobile node, foreign agent, and foreign domain using the registration request transmitted by the mobile node.

As illustrated in FIG. 14d, upon receiving the registration request 3000, the home AAA server 1018 may then relay the encrypted registration request 3000 to the home agent 1010 using the communication pathway 1022 in step 2026. The home agent 1010 may then authenticate the mobile node 1002, foreign domain 1004, and foreign agent 1006 by decrypting the registration request 3000 using the encryption key KEY 0 in step 2028. After registration of the mobile node 1002, foreign domain 1004, and foreign agent 1006 with the home agent 1010, the home agent 1010 may then request the key distribution center 1024 to generate the encryption keys, KEY 1, KEY 2, and KEY 3 in step 2030. The key distribution center 1024 may then generate the encryption keys, KEY 1, KEY 2, and KEY 3, and transmit the encryption keys to the home agent for distribution to the mobile node 1002 and foreign agent 1006 in steps 2032 and 2034.

As illustrated in FIGS. 15a, 15b, 15c, and 15d, in steps 2036, 2038, 2040, 2042, 2044, and 2046, the home agent 1010 may distribute the encryption keys, KEY 1, KEY 2, and KEY 3, to the mobile node 1002 and the foreign agent 1006 by transmitting a registration reply 4000 that, in an exemplary embodiment, includes one or more of the elements and teachings of the registration reply 300. In an exemplary embodiment, the foreign agent 1006 receives the registration reply 4000 and extracts the encryption keys KEY 2 and KEY 3 in unencrypted form. The mobile node 1002 then receives the registration reply 4000 and extracts the encryption keys KEY 3 and KEY 1 in encrypted form. The mobile node 1002 then decrypts the encrypted form of the encryption keys KEY 3 and KEY 1 using the encryption key KEY 0.

More generally, the system 1000 may include a plurality of mobile nodes 1002, foreign domains 1004, foreign agents 1006, foreign AAA servers 1008, home AAA servers 1018, home agents 1010, communication pathways, 1012, 1014, 1016, 1020, and 1026, and key distribution centers 1024. In the general application of the system 1000, all of the encryption keys are unique thereby providing security for all communication pathways and entities. More generally, the encryption keys, KEY 0, KEY 1, KEY 2, and KEY 3, may be security associations that define the security parameters of the communications between the respective entities of the network 1000.

Figure 16:
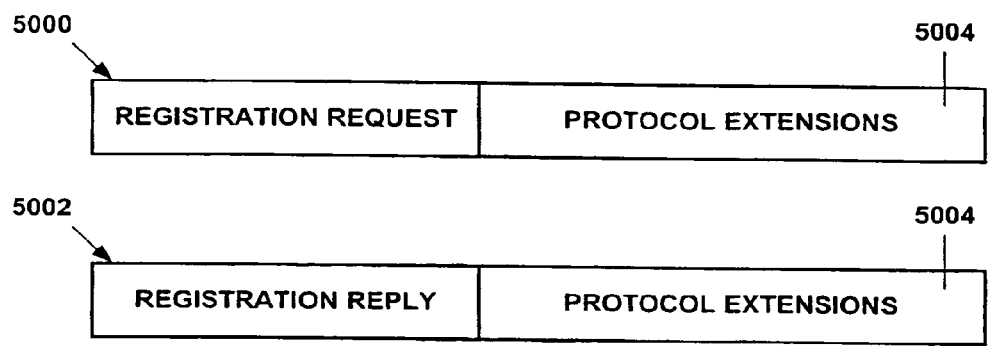
FIG. 16 is a schematic illustration of embodiments of registration requests and replies that include protocol extensions for negotiating the security associations between entities in a communications network.

In an exemplary embodiment, as illustrated in FIG. 16, the systems 100 and 1000 utilize registration requests 5000 and registration replies 5002 that include protocol extensions 5004 for facilitating the negotiation and establishment of the security associations between the various entities of the systems 100 and 1000 (e.g., the mobile node, foreign agents, and home agents).

Figure 17:
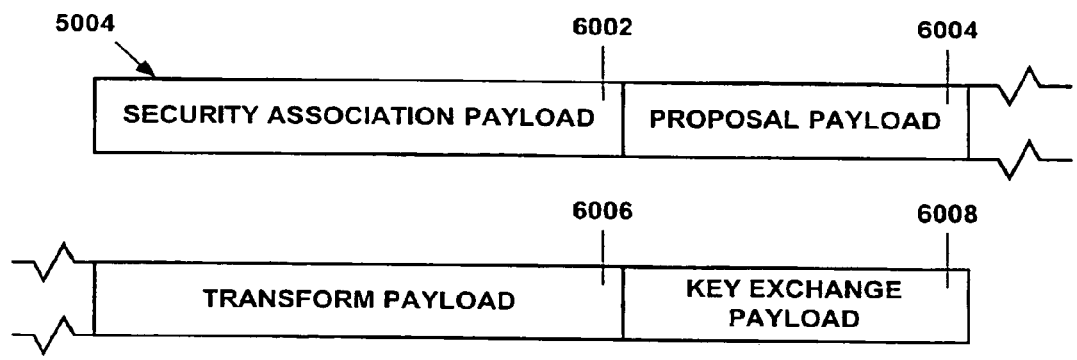
FIG. 17 is a schematic illustration of an embodiment of the protocol extensions of FIG. 16.

In an exemplary embodiment, as illustrated in FIG. 17, the protocol extensions 5004 include a security association payload 6002, a proposal payload 6004, a transform payload 6006, and/or a key exchange payload 6008.

Figure 18:
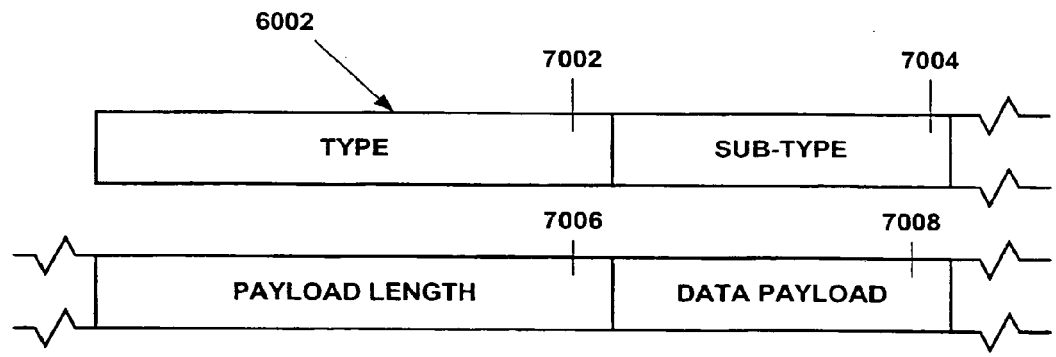
FIG. 18 is a schematic illustration of an embodiment of the security association payload protocol extension of the protocol extensions of FIG. 17.

In an exemplary embodiment, the security association payload 6002 may be used to negotiate security association attributes. The security association payload 6002 may be carried as an extension, or as a substitute, for messages such as, for example, the registration requests 300,3000, and 5000. In an exemplary embodiment, as illustrated in FIG. 18, the security association payload 6002 includes a security association type 7002, a security association sub-type 7004, a payload length 7006, and a data payload 7008. In an exemplary embodiment, the security association sub-type 7004 may be: (1) the security association between a mobile node and a home agent; (2) the security association between a mobile node and a foreign agent; (3) the security association between a home agent and a foreign agent; and (4) the security association between a mobile node and a serving mobility manager (SMM). In this manner, the particular entities associated with the security association may be identified. In an exemplary embodiment, the payload length 7006 may indicate the length in octets of the global security association payload, including the security association payload 6002, all proposal payloads 6004, and all transform payloads 6006 associated with the proposed security association. In an exemplary embodiment, the data payload 7008 may include all proposal payloads 6004, and all transform payloads 6006 associated with the proposed security association.

Figure 19:
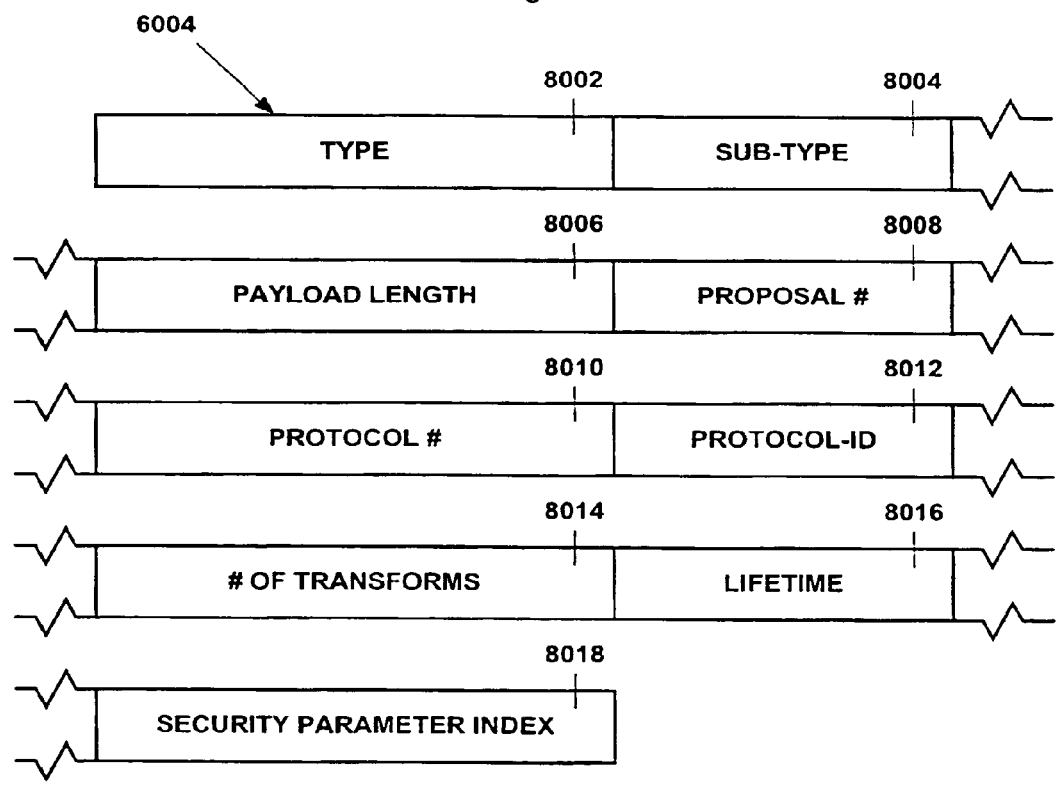
FIG. 19 is a schematic illustration of an embodiment of the proposal payload protocol extension of the protocol extensions of FIG. 17.

The proposal payload 6004 may include information used during the negotiation of security associations between entities in a communication network. In particular, the proposal payload 6004 may include security mechanisms, or transforms, to be used to secure the communications pathway, or channel. The proposal payload 6004 may be carried as an extension, or as a substitute, for messages such as, for example, the registration requests 300,3000, and 5000. In an exemplary embodiment, as illustrated in FIG. 19, the proposal payload 6004 includes a proposal type 8002, a proposal sub-type 8004, a payload length 8006, a proposal number 8008, a protocol number 8010, a protocol-ID 8012, a number of transforms 8014, a lifetime 8016, and a security parameters index 8018. In an exemplary embodiment, the payload length 8006 may indicate the length in octets of the entire proposal payload, including the proposal payload 6002, and all transform payloads 6004 associated with the particular proposal payload. In an exemplary embodiment, if there are multiple proposal payloads with the same proposal number, then the payload length 8006 only applies to the current proposal payload and not to all proposal payloads. In an exemplary embodiment, the proposal number 8008 may indicate the proposal number for the current proposal payload 6004. In an exemplary embodiment, the protocol number 8010 may indicate the protocol number for the current proposal payload 6004. The protocol refers generally to the algorithm, or transform, used to encrypt/decrypt messages between entities. In an exemplary embodiment, the protocol-ID 8012 may indicate the general type of protocol for the current proposal payload 6004.

In an exemplary embodiment, the general type of protocol may include an authentication protocol or an encryption protocol. In an exemplary embodiment, the number of transforms 8014 may indicate the number of transforms used in the proposal payload 6004. In an exemplary embodiment, the lifetime 8016 may indicate the lifetime of the security association associated with the proposal payload 6004. In an exemplary embodiment, the security parameters index 8018 provides an index value that refers to one or more predefined or dynamic security associations, security transforms, and/or other security definitions maintained in a database that is resident in one or more of the entities in a communication network.

Figure 20:
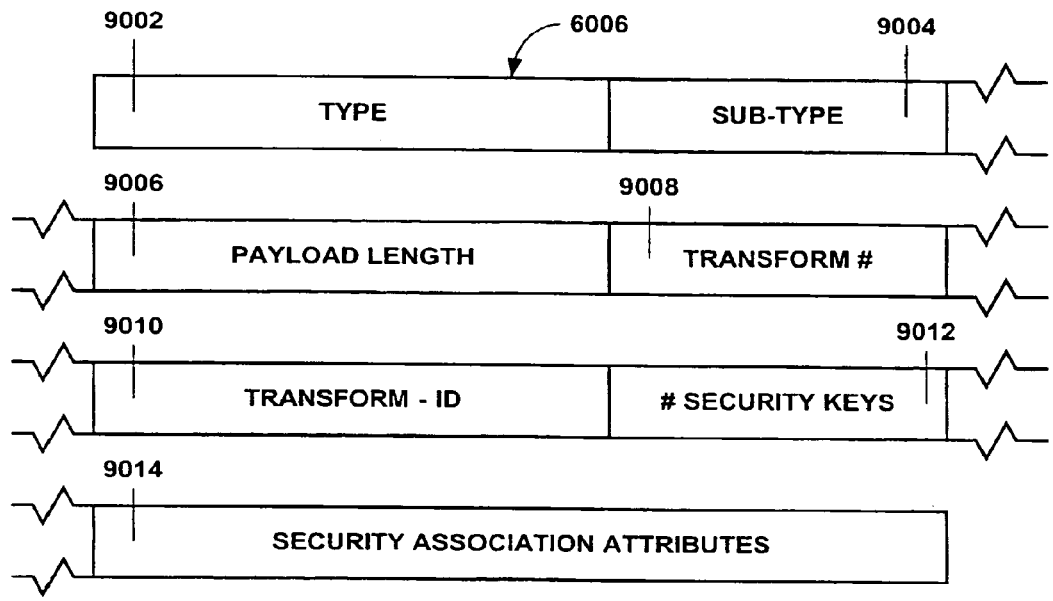
FIG. 20 is a schematic illustration of an embodiment of the transform payload protocol extension of the protocol extensions of FIG. 17.

The transform payload 6006 may include information used during a security association negotiation. In an exemplary embodiment, the transform payload 6006 includes the specific security mechanisms, or transforms, to be used to secure the communications pathway, or channel (e.g., the encryption/decryption algorithms used to encode/decode communications between the entities associated with the security association). The transform payload 6006 also may include the security association attributes associated with the particular transform. In an exemplary embodiment, as illustrated in FIG. 20, the transform payload 6006 includes a transform payload type 9002, a transform payload sub-type 9004, a transform payload length 9006, a transform number 9008, a transform ID 9010, the number of security keys 9012, and security association attributes 9014. In an exemplary embodiment, the transform payload length 9006 provides the length in octets of the current transform payload 6006, the transform values, and all security association attributes. In an exemplary embodiment, the transform number 9008 identifies the transform number for the current transform payload 6006. In an exemplary embodiment, if there is more than one transform proposed for a specific protocol within the proposal payload, then each transform payload 6006 has a unique transform number. In an exemplary embodiment, the transform identification 9010 specifies the transform identifier within the current proposal. In an exemplary embodiment, the number of security keys 9012 identifies the number of security keys required for the transform. In an exemplary embodiment, the security association attributes 9014 includes the security association attributes for the transform identified in the transform identification 9010. In an exemplary embodiment, the security association attributes are represented using TLV format.

The key exchange payload 6008 may define the key exchange technique and/or the encryption key to be employed in exchanging encryption keys between the entities associated with the security association in a communications network. In an exemplary embodiment, the key exchange payload 6008 may include: (1) a predefined Diffie-Hellman with predefined groups key exchange payload 6008a, (2) a user defined Diffie-Hellman group key exchange payload 6008b; and/or (3) a key distribution center generated secret key exchange payload 6008c.

Figure 21:
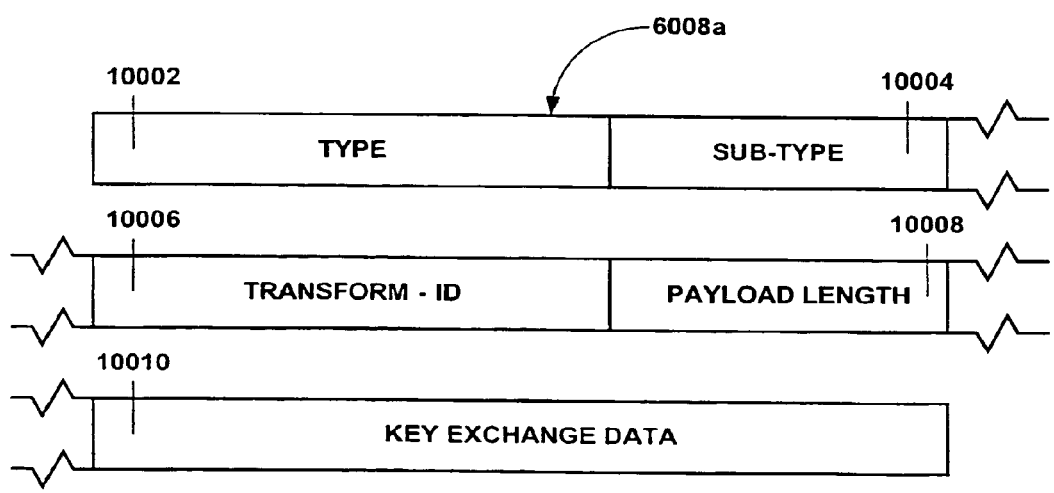
FIG. 21 is a schematic illustration of an embodiment of the key exchange payload protocol extension for a predefined Diffie-Hellman group and secret key of the protocol extensions of FIG. 17.

In an exemplary embodiment, as illustrated in FIG. 21, the predefined Diffie-Hellman with predefined groups key exchange payload 6008a may include a Diffie-Hellman type 10002, a sub-type 10004, a transform identification 10006, a payload length 10008, and key exchange data 10010. In an exemplary embodiment, the sub-type 10004 may be a Diffie-Hellman group 1, a Diffie-Hellman group 2, or a secret key transferred through a secure path. In an exemplary embodiment, the payload length 10008 may indicate the length in octets of the current payload. In an exemplary embodiment, the key exchange data 10010 may include the key generated by the key distribution center or the Diffie-Hellman computed value.

Figure 22:
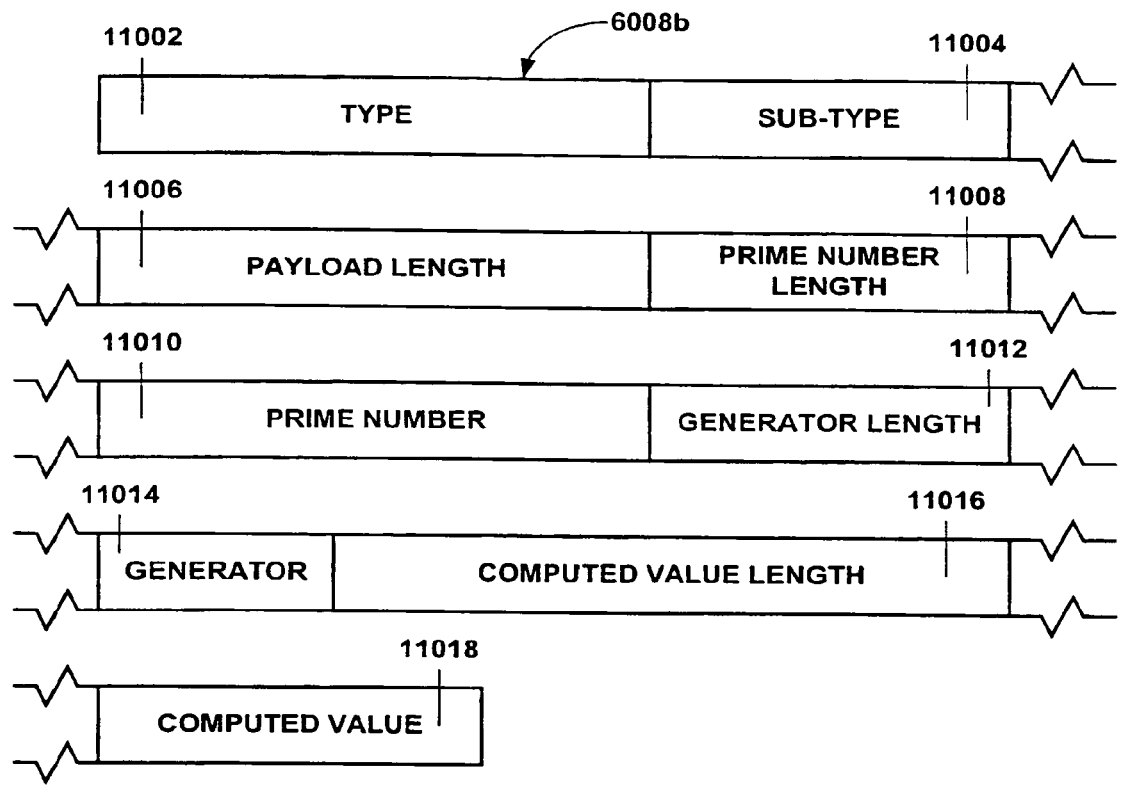
FIG. 22 is a schematic illustration of an embodiment of the key exchange payload protocol extension for a Diffie-Hellman with new define group of the protocol extensions of FIG. 17.
Figure 23:
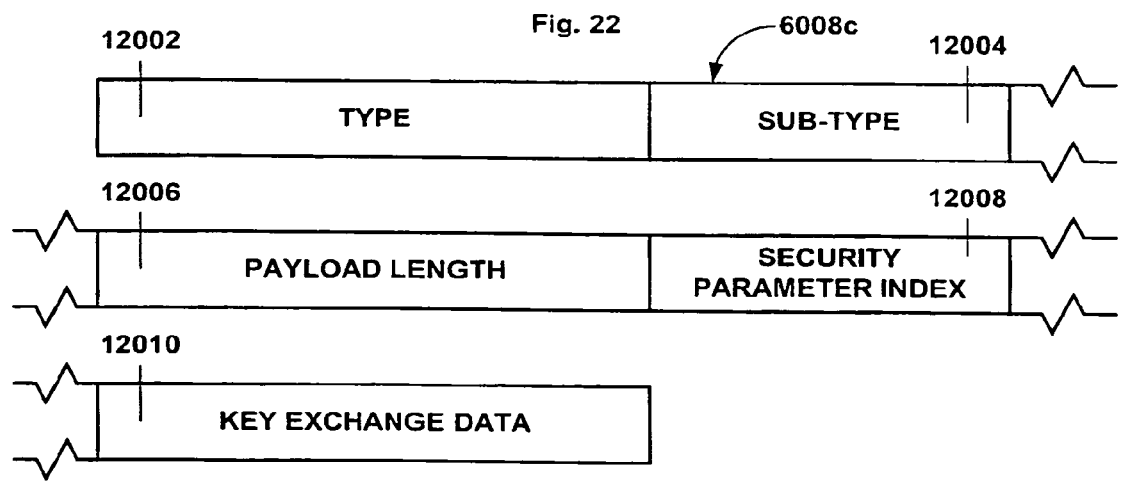
FIG. 23 is a schematic illustration of an embodiment of the key exchange payload protocol extension for an encrypted secret key of the protocol extensions of FIG. 17.

In an exemplary embodiment, as illustrated in FIG. 22, the user defined Diffie-Hellman group key exchange payload 6008*b* may include a Diffie-Hellman type 11002, a sub-type 11004, a payload length 11006, a prime number length 11008, a prime number 11010, a generator length 11012, a generator 11014, a computed value length 11016, and a computed value 11018. In an exemplary embodiment, the sub-type 11004 may be a user defined group. In an exemplary embodiment, the payload length 11006 may indicate the length in octets of the current payload. In an exemplary embodiment, the prime number length 11008 indicates the length of the prime number used in the Diffie-Hellman key exchange algorithm. In an exemplary embodiment, the prime number 11010 may be the prime number used in the Diffie-Hellman key exchange algorithm. In an exemplary embodiment, generator length 11012 indicates the length of the generator used in the Diffie-Hellman key exchange algorithm. In an exemplary embodiment, the generator 11014 may be the generator used in the Diffie-Hellman key exchange algorithm. In an exemplary embodiment, if P is the prime number used in the Diffie-Hellman exchange, then the generator G should be less than, and a primitive root of, P. In an exemplary embodiment, the computed value length 11016 is the length of the public computed value for the Diffie-Hellman key exchange.

In an exemplary embodiment, the key distribution center generated secret key exchange payload 6008*c* includes a type 12002, a sub-type 12004, a payload length 12006, a security parameter index 12008, and key exchange data 12010. In an exemplary embodiment, the sub-type 12004 may include a secret key that is transferred in encrypted form using the security association defined by a security parameter index. In an exemplary embodiment, the payload length 12006 indicates the length in octets of the current payload. In an exemplary embodiment, the key exchange data 12010 includes the secret key generated by the key distribution center and encrypted using the security association defined by the security parameter index.

In an exemplary embodiment, the security association payloads 6002, the proposal payloads 6004, the transform payloads 6006, and the key exchange payloads 6008 are used to build security association protocol extensions 5004 that are in turn carried as a payload for messages such as registration requests 5000 and registration replies 5002 for the negotiation and establishment of security associations between different entities (e.g., mobile node and foreign agent, foreign agent and home agent, mobile node and SMM).

In an exemplary embodiment, a security association 13000 may be defined by a single security association payload 6002 followed by at least one, and possibly many, proposal payloads 6004, with at least one, and possibly many, transform payloads 6006 associated with each proposal payload. In an exemplary embodiment, each proposal payload 6004 includes a security parameter index and the lifetime defined for the security association. In an exemplary embodiment, each transform payload 6006 may include the specific security mechanisms, or transforms, to be used for the designated protocol. In an exemplary embodiment, the proposal and transform payloads, 6004 and 6006, are only used during the security association establishment negotiation between the entities.

Figure 24:
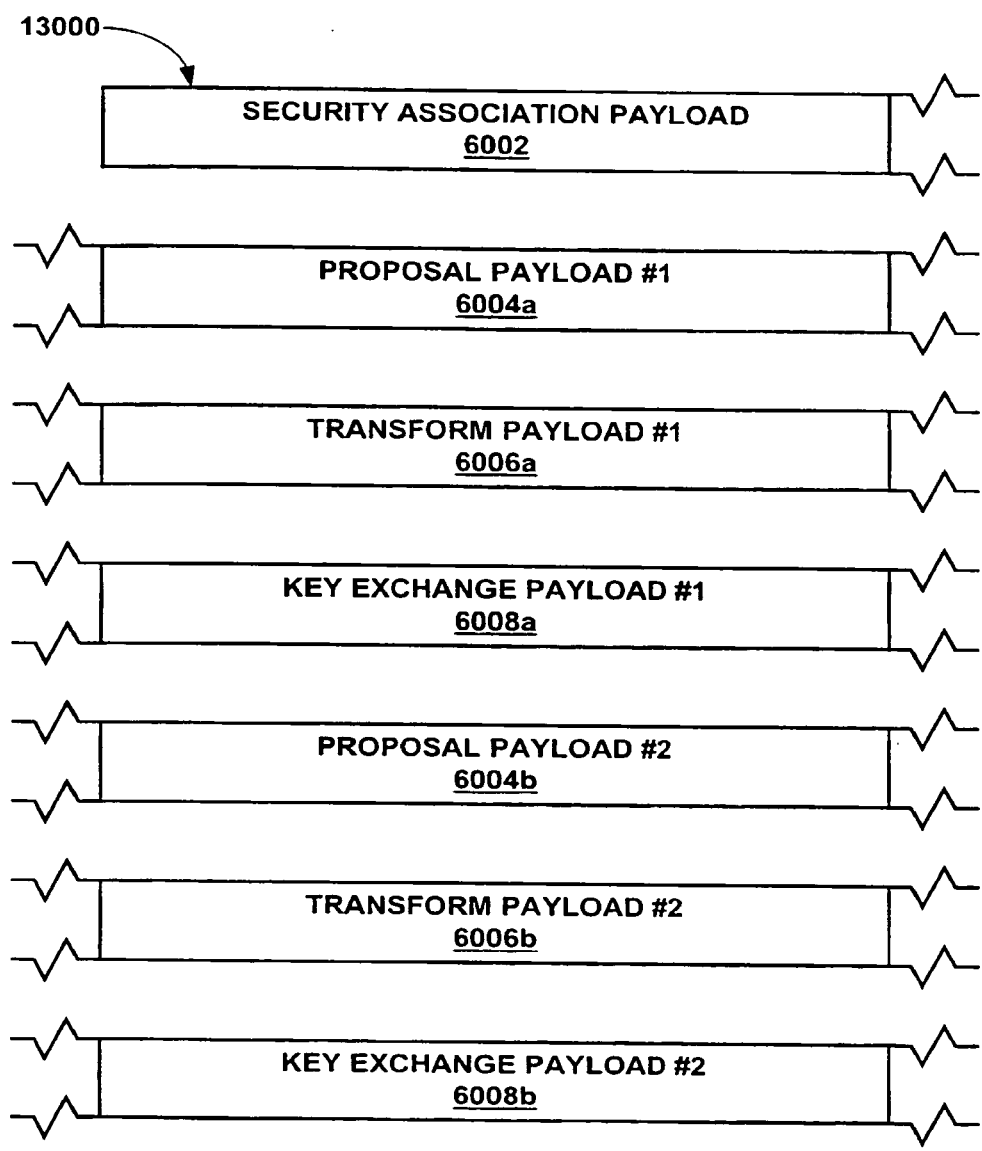
FIG. 24 is a schematic illustration of an illustrative embodiment of a security association negotiation between an initiator and a responder in a communication network.

Thus, in an exemplary embodiment, as illustrated in FIG. 24, a security association 13000 may include a security association payload 6002 with a first proposal payload 6004*a* with associated transform and key exchange payloads, 6006*a* and 6008*a*, and a second proposal payload 6004*b* with associated transform and key exchange payloads, 6006*b* and 6008*b*.

Figure 25:
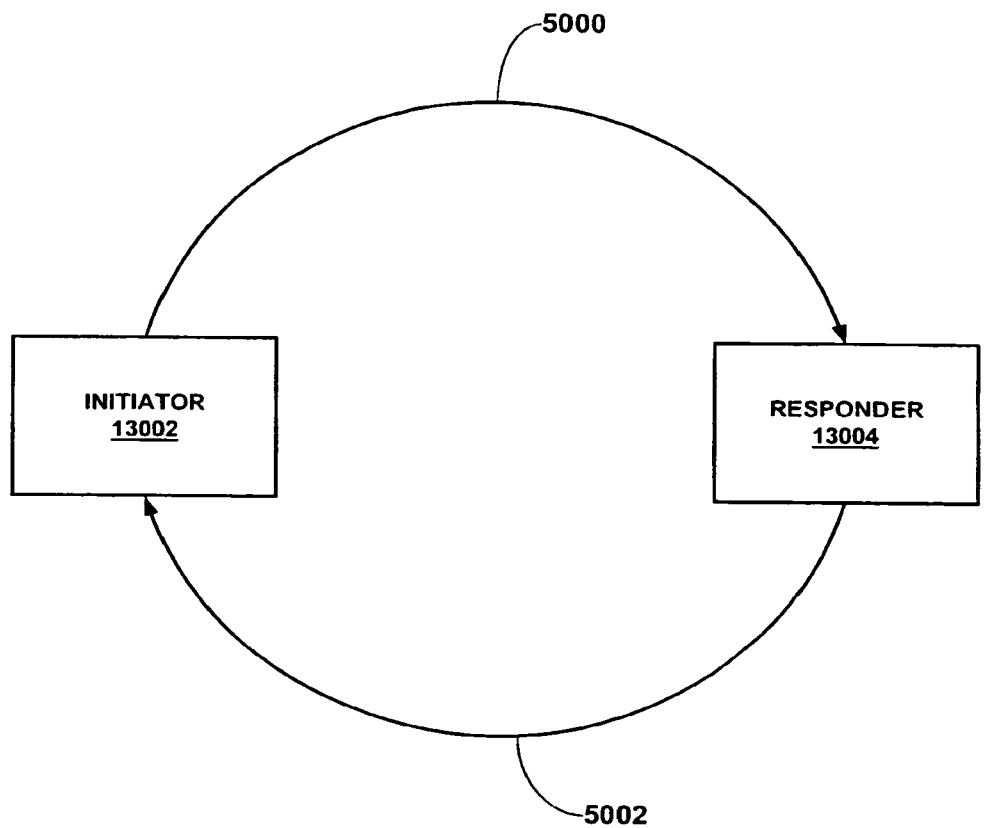
FIG. 25 is a schematic illustration of an embodiment of a security association negotiation between an initiator and a responder in a communications network.

More generally, as illustrated in FIG. 25, an initiating entity 13002 may negotiate the security association with a responding entity 13004 using a registration request 5000 that may include the security association payload 6002, and one or more of the proposal payload 6004, the transform payload 6006, and the key exchange payload 6008. In this manner, the initiating entity 13002 (e.g. a mobile node) may engage in a negotiation with the responding entity (e.g. a home agent) in which the entities dynamically negotiate the security association between the entities. In this manner, the entities may dynamically generate and/or modify the security association between the entities.

In particular, the proposal payload 6004 provides the initiating entity 13002 (e.g., mobile node) with the capability to present to the responding entity 13004 (e.g., foreign agent, home agent, SMM, or home mobility manager (HMM)) the security protocols and associated security mechanisms for use with the security association being negotiated.

Figure 26:
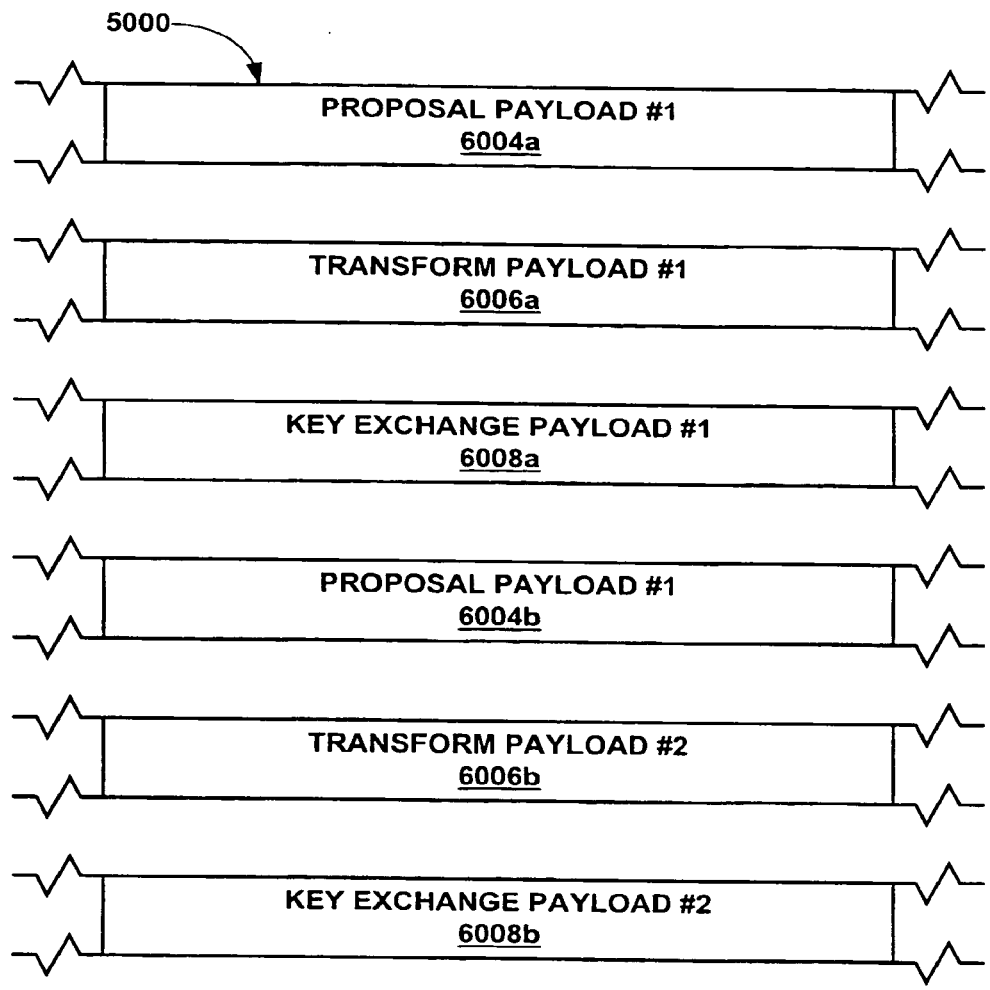
FIG. 26 is a schematic illustration of an illustrative embodiment of a registration request for use in the communications network of FIG. 25.
Figure 27:
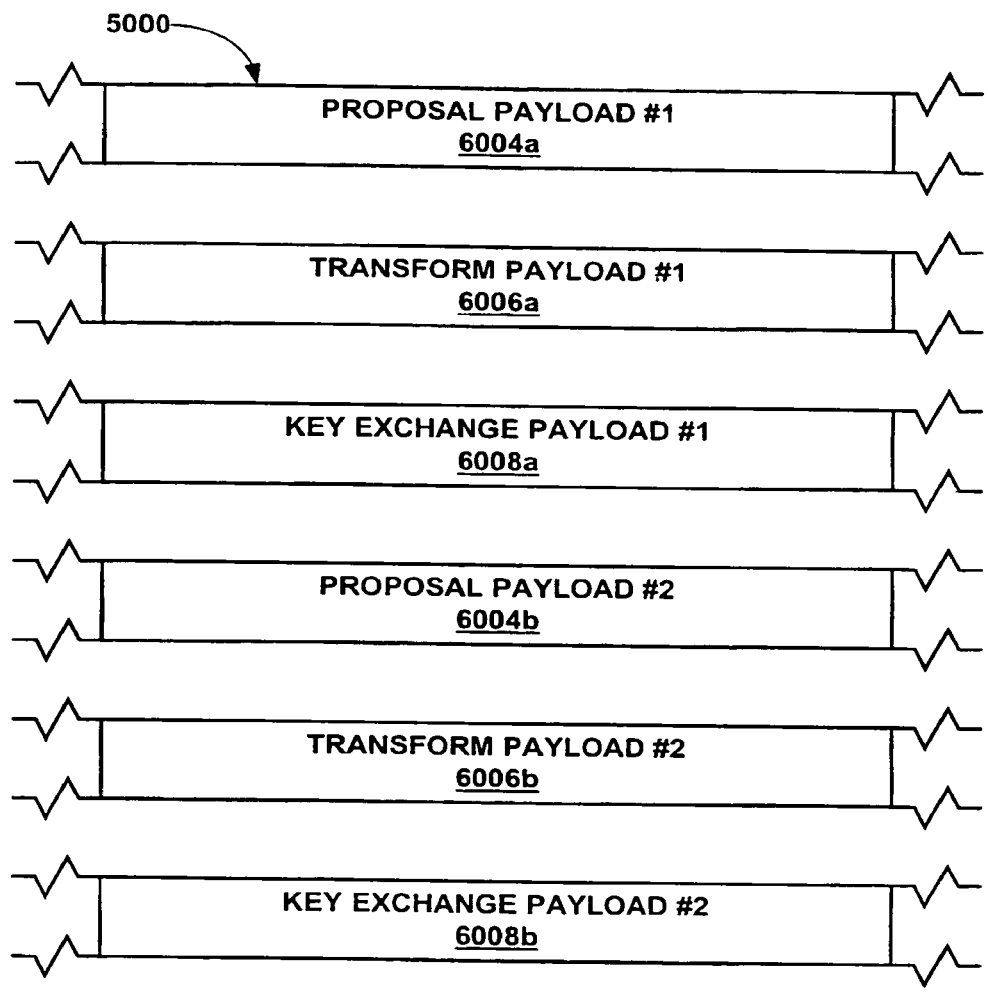
FIG. 27 is a schematic illustration of an illustrative embodiment of a registration request for use in the communications network of FIG. 25.

In an exemplary embodiment, as illustrated in FIG. 26, If the security association establishment negotiation combines multiple protocols (e.g., authentication and encryption), then the registration request 5000 may include multiple proposal payloads 6004, each with the same proposal number. These proposal payloads 6004 may be considered as one global proposal and should not be separated by a proposal with a different proposal number. The use of the same proposal number in multiple proposal payloads 6004 provides a logical AND operation (e.g., protocol 1 AND protocol 2). On the other hand, as illustrated in FIG. 27, in an exemplary embodiment, if the security association establishment negotiation includes different security protection methods, then the registration request 5000 may include multiple proposal payloads 6004, each with a monotonically increasing proposal numbers. The use of different proposal numbers in multiple proposal payloads 6004 provides a logical OR operation (e.g., proposal 1 OR proposal 2), where each proposal payload 6004 may include more than one protocol.

Figure 28:
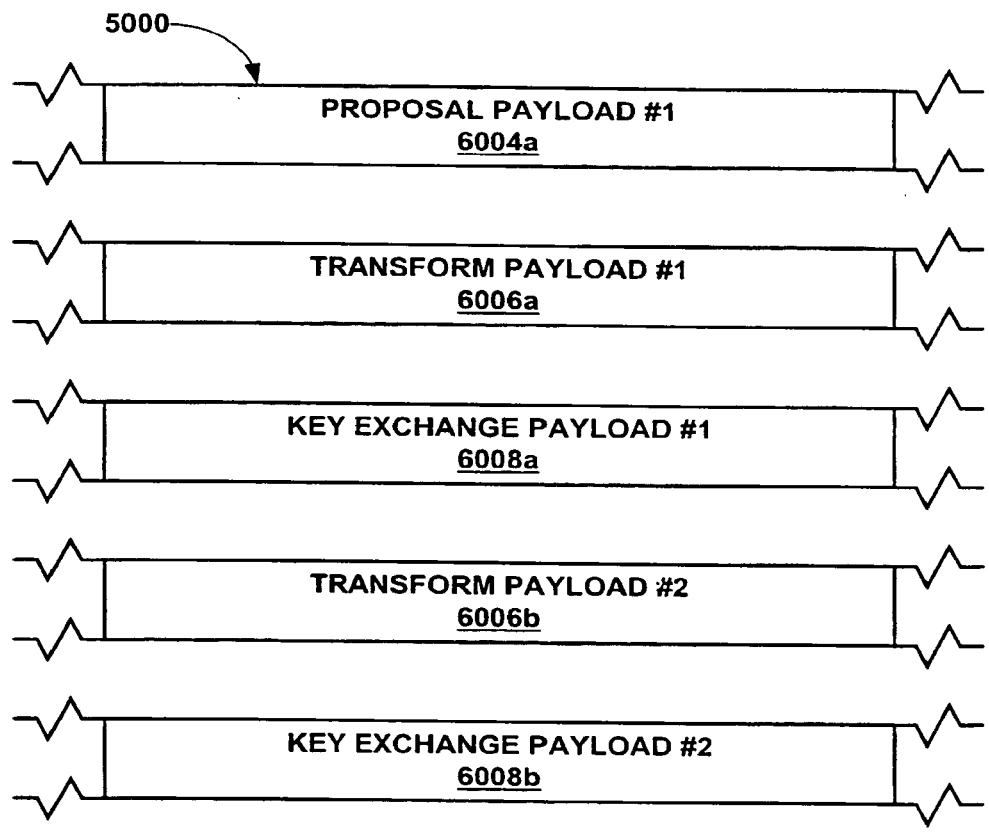
FIG. 28 is a schematic illustration of an illustrative embodiment of a registration request for use in the communications network of FIG. 25.

The transform payload 6006 provides the initiating entity 13002 with the capability to present to the responding entity 13004 multiple security mechanisms or transforms for each proposal. In an exemplary embodiment, as illustrated in FIG. 28, the registration request 5000 may include several transforms associated with a specific proposal payload 6004, each identified in a separate transform payload 6006. The multiple transforms may be presented with monotonically increasing numbers in the preference order of the initiator 13002. The receiving entity 13004 may then select a single transform for each protocol in a proposal or reject the entire proposal. The use of the transform number in multiple transform payloads 6006 provides a second level OR operation (e.g., transform 1 OR transform 2 OR transform 3).

In an exemplary embodiment, when responding to a security association payload 6002 transmitted by the initiator 13002, the responder 13004 may send a registration response 5002 including a security association payload 6002 that may include multiple proposal payloads 6004 and their associated transform payloads 6006. Each of the proposal payloads 6003 should include a single transform payload 6006 associated with the protocol.

More generally, when responding to a registration request 5000 from the initiator 13002, the responder 13004 may accept all or a portion of the proposed security association, and/or propose an alternative security association. The initiator 13002 may then accept all or a portion of the alternative security association proposed by the responder 13004. This back-and-forth negotiation may then continue until the initiator 13002 and responder 13004 have agreed upon all of the elements of the security association. In this manner, the initiator 13002 and responder 13004 may dynamically negotiate a new or modified security association.

In an exemplary embodiment, the initiator 13002 and the responder 13004 may generate encryption keys using: (1) a stateless key generation mode 14000; (2) a statefull key generation mode 15000; or (3) a semi-statefull key generation mode 16000.

Figure 29:
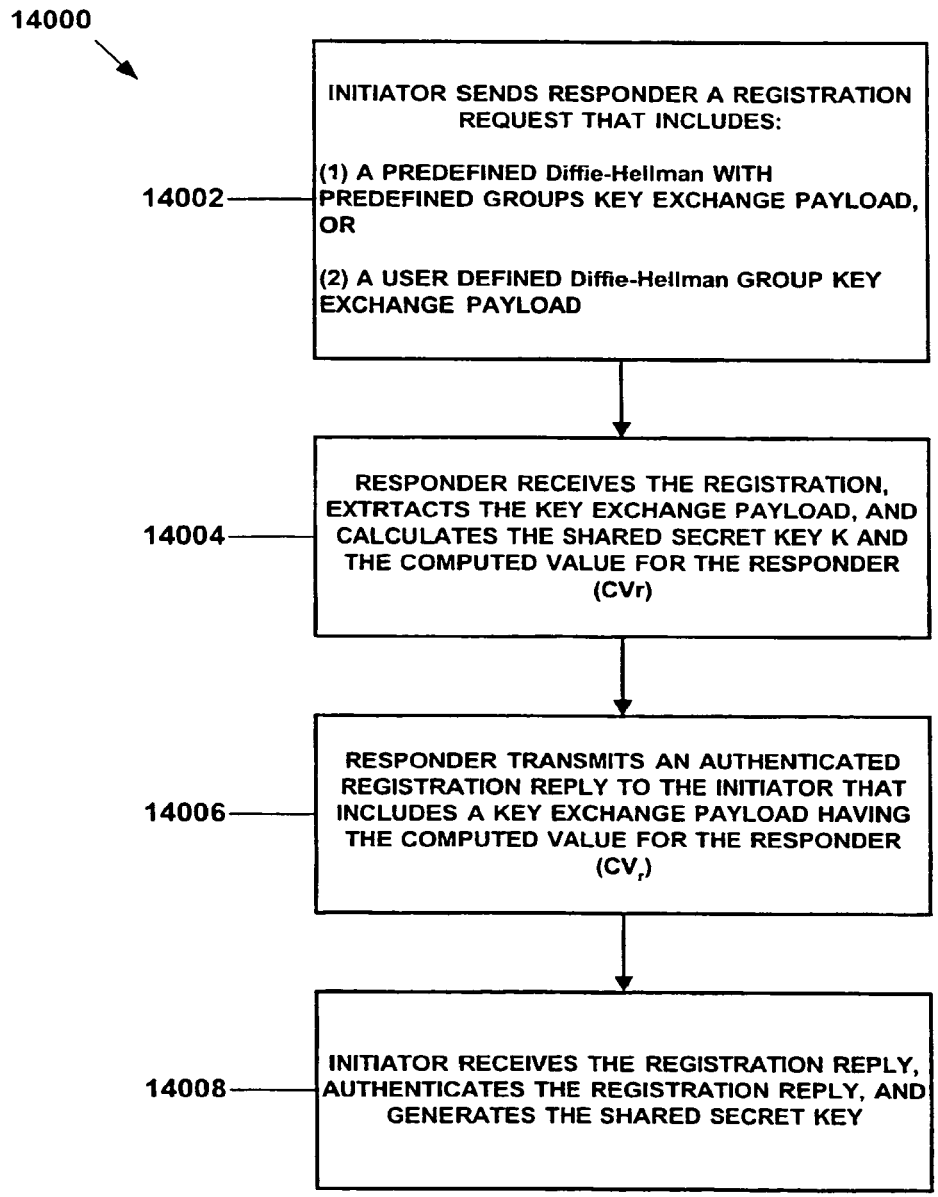
FIG. 29 is a flow chart illustration of an embodiment of a stateless key generation.

In an exemplary embodiment, as illustrated in FIG. 29, the stateless key generation mode 14000 includes the initiator 13002 sending the responder 13004 a registration request 5000 that includes: (1) a predefined Diffie-Hellman with predefined groups key exchange payload 6008a, or (2) a user defined Diffie-Hellman group key exchange payload 6008b in step 14002. In an exemplary embodiment, if the initiator 13002 selected a Diffie-Hellman Group 1 or Group 2 subtype, then the initiator 13002 may calculate the computed value for the initiator (CVi) using the formula:

$$CVi = (G^{Xi}) \bmod P \qquad (1)$$

where CVi=the computed value for the initiator; G=the group generator; P=the prime number; and Xi=the random number generated by the initiator.

In an exemplary embodiment, the Diffie-Hellman Group 1 prime number P and group generator G are: $2^{768}-2^{704}-1+2^{64}*\{[2^{638}\pi]+149686\}$ and 2, respectively. In an exemplary embodiment, the Diffie-Hellman Group 2 prime number P and group generator G are: $2^{1024}-2^{960}-1+2^{64}*\{[2^{894}\pi]+129093\}$ and 2, respectively.

The responder 13004 may then receive the registration request 5000, extract the key exchange payload, 6008a or 6008b, and calculate the shared secret key K and the computed value for the responder (CVr) in step 14004. In an exemplary embodiment, the responder 13004 calculates the shared secret key K and the computed value for the responder (CVr) using the formula:

$$K = (CVi^{Xr}) \bmod P = (G^{XiXr}) \bmod P \qquad (2)$$

$$CVr = (G^{Xr}) \bmod P \qquad (3)$$

where K=the secret shared key; CVi=the computed value for the initiator; P=the prime number; G=the group generator; Xi=the random number generated by the initiator; Xr=the random number generated by the responder; and CVr=the computed value for the responder.

The responder 13004 may then send an authenticated registration reply 5002 to the initiator 13002 that includes the computed value for the responder (CVr) in step 14006. Upon receiving the registration reply 5002, the initiator 13002 may authenticate the message and generate the shared secret key K in step 14008. In an exemplary embodiment, in step 14008, the initiator 13002 may generate the shared secret key K using the following formula:

$$K = (CVr^{Xi}) \bmod P = (G^{XrXi}) \bmod P \qquad (4)$$

where K=the secret shared key; CVi=the computed value for the initiator; P=the prime number; G the group generator; Xi=the random number generated by the initiator; Xr=the random number generated by the responder; and CVr=the computed value for the responder.

The shared secret key K may then be used to authenticate or encrypt messages transmitted between the initiator 13002 and responder 13004. The shared secret key K may also be used to authenticate IKEs main mode or aggressive mode in order to start future security association and key exchanges between the initiator 13002 and responder 13004. In addition, the shared secret key K may be used to initiate an IPsec secure communication pathway, or channel, between the initiator 13002 and responder 13004. Thus, the stateless key generation mode 14000 does not require any interaction with a key distribution center. Furthermore, as will be recognized by persons having ordinary skill in the art, IKE, the IKE main mode, the IKE aggressive mode, and IPsec are considered well known in the art.

In an exemplary embodiment, the statefull key generation mode 15000 provides encryption keys to the different entities (e.g., mobile node, foreign agent, and home agent) by obtaining the encryption keys from the key distribution centers 116 or 1024. The encryption keys (e.g., KEY 1, KEY 2, and KEY 3) are then distributed to the entities using a secure communication pathway, or channel. If the security association between the entities is not yet established, then the encryption keys may be encrypted using a predefined shared secret key KEY 0 known only to the initiator 13002 and responder 13004.

In an exemplary embodiment, the semi-statefull key generation mode 16000 provides encryption keys to the different entities (e.g., mobile node, foreign node, and home agent) by obtaining a single seed encryption key $KEY_{SEED}$ that is then used by the various entities to generate the encryption keys for communications between the different entities (e.g., mobile node to home agent).

In an exemplary embodiment, the encryption key Ki/Kr for communications between the initiator 13002 and the recipient 13004 is derived using the following formula:

$$Ki = Kr = prf(K_{SEED}, NAIr|NAIi|IPr|IPi) \qquad (5)$$

where Ki=encryption key for communications between the initiator and recipient; Kr=encryption key for communications between the initiator and recipient; prf=pseudo random function; $K_{SEED}$=seed encryption key; NAIr=network access identifier for the responder; NAIi=network access identifier for the initiator; IPr=IP address for the recipient; and IPi=IP address for the initiator.

The present illustrative embodiments provide a number of advantages.

For example, the networks 100 and 1000 provide user confidentiality during the authentication and registration process. In addition, the networks 100 and 1000 provide centralized encryption key generation and distribution thereby providing enhanced efficiency. Furthermore, the networks 100 and 1000 provide centralized key generation and distribution on a real-time basis thereby providing proactive key distribution. In addition, the networks 100 and 1000 are implementable using extensions to existing IP communications protocols such as, for example, mobile IP. Furthermore, the mobile nodes, the foreign agents and the foreign domains of the networks 100 and 1000 are authenticated before the start of message transmissions thereby maintaining a high level of security. In addition, the identity of the mobile nodes and the user's personal information in the networks 100 and 1000 are protected from detection during the initial registration and authentication phase. Furthermore, the encryption keys are distributed in the networks 100 and 1000 such that secure communication pathways using the keys are established for a particular mobile node and are not shared by another mobile node. In addition, and more generally, the security association negotiation of the present disclosure, whether implemented in the networks 100 or 1000, or another communication network, provides a number of advantages. For example, the security association between an initiator and a responder can be dynamically configured thereby providing a rapid and efficient method of securing communications between the initiator and responder.

Furthermore, the teachings of the present disclosure can be applied to any network to thereby provide a security association between any group or groups of entities in the network. Finally, the security association created can have a predefined duration and can also be renewed or redefined by the entities in the network.

It is understood that variations may be made in the foregoing without departing from the scope of the invention. For example, the teachings of the communication networks 100 and 1000 may be adapted and extended for use in communication networks in general. In addition, the communication protocol utilized in the communication networks 100 and 1000 may be extended to general application in all communication networks. Furthermore, the elements and functionality of the communication network 100 may be employed in the communication network 1000, and vice versa. In addition, the central key distribution center 24 of the communication network 100 may be distributed among a plurality of functional elements, including the home agent 18. In addition, the central key distribution center 1024 of the communication network 1000 may be distributed among a plurality of functional elements, including the home agent 1010 and the home AAA server 1018. In addition, the key distribution centers 24 and 1024 may or may not be positioned within the home domains 18*a* and 1010*a*. Finally, the teachings of the security association negotiation between the initiator 13002 and the responder 13004 may be applied to the communication networks 100 and 1000, as well as to communication networks in general in order to provide a dynamic system for providing security associations between entities in a communication network.

Although illustrative embodiments of the invention have been shown and described, other modifications, changes, and substitutions are intended in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A method of providing secure communication between an initiator and a responder in a communication network, comprising:
    sending a registration request with a plurality of proposals for dynamically establishing a security association between the initiator and the responder; and
    receiving a registration response indicating whether none or a multiplicity of the plurality of proposals have been accepted for the security association.

2. The method of claim 1, further comprising securely communicating in the communication network using a security association corresponding to an accepted one or more proposals out of the plurality of proposals.

3. The method of claim 1, wherein the registration response further includes one or more other proposals for dynamically establishing another security association between the initiator and the responder.

4. The method of claim 3, further comprising:
    sending another response indicating whether any of the one or more other proposals have been accepted for the another security association; and
    securely communicating in the communication network using the another security association corresponding to the accepted one or more other proposals.

5. The method of claim 1, wherein the plurality of proposals include proposing a number of security transformations to be used to provide the secure communication.

6. The method of claim 1, wherein the plurality of proposals include proposing a type of security transformation to be used to provide the secure communication.

7. The method of claim 1, wherein the plurality of proposals include proposing a duration of at least a portion of the security association.

8. The method of claim 1, wherein the initiator includes a mobile node, and wherein the responder includes one of a home agent, a home mobility manager (HMM), a serving mobility manager (SMM), and a foreign agent.

9. A method of providing secure communication between an initiator and a responder in a communication network, comprising:
    receiving a registration request with a plurality of proposals for dynamically establishing a security association between the initiator and the responder; and
    sending a registration response indicating whether none or a multiplicity any of the plurality of proposals have been accepted for the security association.

10. The method of claim 9, further comprising securely communicating in the communication network using a security association corresponding to an accepted one or more proposals out of the plurality of proposals.

11. The method of claim 9, wherein the registration response further includes one or more other proposals for dynamically establishing another security association between the initiator and the responder.

12. The method of claim 11, further comprising:
    receiving another response indicating whether any of the one or more other proposals have been accepted for the another security association; and
    securely communicating in the communication network using the another security association corresponding to the accepted one or more other proposals.

13. The method of claim 9, wherein the plurality of proposals include proposing a number of security transformations to be used to provide the secure communication.

14. The method of claim 9, wherein the plurality of proposals include proposing a type of security transformation to be used to provide the secure communication.

15. The method of claim 9, wherein the plurality of proposals include proposing a duration of at least a portion of the security association.

16. The method of claim 9, wherein the initiator includes a mobile node, and wherein the responder includes one of a home agent, a home mobility manager (HMM), a serving mobility manager (SMM), and a foreign agent.

17. A system comprising:
    at least one of an initiator or
    a responder configured to communicate over a communication pathway that couples the at least one of the initiator and the responder;

the initiator and responder being configured to communicate messages over the communication pathway including:

a registration request with a plurality of proposals for dynamically establishing a security association between the initiator and the responder; and a registration response indicating whether none or a multiplicity of the plurality of proposals have been accepted for the security association;

wherein at least one of the initiator and responder is a hardware device.

18. The system of claim 17, wherein the messages include communications secured using a security association corresponding to an accepted one or more proposals out of the plurality of proposals.

19. The system of claim 17, wherein the registration response further includes one or more other proposals for dynamically establishing another security association between the initiator and the responder.

20. The system of claim 19, wherein the messages further include:

another response indicating whether any of the one or more other proposals have been accepted for the another security association; and communications secured using the another security association corresponding to the accepted one or more other proposals.

21. The system of claim 17, wherein the plurality of proposals includes one or a combination of:

a proposal proposing a number of security transformations to be used to provide the secure communication;

a proposal proposing a type of security transformation to be used to provide the secure communication; or a proposal proposing a duration of at least a portion of the security association.

22. The system of claim 17, wherein the initiator includes a mobile node.

23. The system of claim 17, wherein the responder includes one of a home agent, a home mobility manager (HMM), a serving mobility manager (SMM), and a foreign agent.

* * * * *